(12) United States Patent
Khlat

(10) Patent No.: US 10,148,310 B2
(45) Date of Patent: Dec. 4, 2018

(54) ANTENNA VSWR RF DUPLEXER

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 193 days.

(21) Appl. No.: 15/204,291

(22) Filed: Jul. 7, 2016

(65) Prior Publication Data

US 2017/0012764 A1   Jan. 12, 2017

Related U.S. Application Data

(60) Provisional application No. 62/189,274, filed on Jul. 7, 2015.

(51) Int. Cl.
  *H04B 1/38* (2015.01)
  *H04B 1/525* (2015.01)
  *H04L 5/14* (2006.01)
  *H04B 1/04* (2006.01)

(52) U.S. Cl.
  CPC .......... *H04B 1/525* (2013.01); *H04B 1/0458* (2013.01); *H04L 5/14* (2013.01); *H04L 5/143* (2013.01)

(58) Field of Classification Search
  CPC .......... H04B 1/44; H04B 1/52; H04B 7/0837; H04B 1/005; H04B 1/0057; H04B 1/406; H04B 1/48; H04B 1/525

USPC .......................................................... 455/73
See application file for complete search history.

(56) References Cited

U.S. PATENT DOCUMENTS

| | | | |
|---|---|---|---|
| 8,149,742 B1* | 4/2012 | Sorsby | H04B 1/006 370/219 |
| 2015/0171897 A1* | 6/2015 | Premakanthan | H04B 1/04 375/219 |
| 2015/0312018 A1* | 10/2015 | Li | H04B 1/0458 370/278 |

* cited by examiner

*Primary Examiner* — Ajibola Akinyemi
(74) *Attorney, Agent, or Firm* — Withrow & Terranova, P.L.L.C.

(57) ABSTRACT

RF circuitry, which includes an antenna VSWR RF duplexer and duplexer control circuitry, is disclosed. The antenna VSWR RF duplexer includes a first hybrid RF coupler having a first main port coupled to an RF antenna, a first isolation port, and a first pair of quadrature ports; a second hybrid RF coupler having a second main port, a second isolation port, and a second pair of quadrature ports; a third hybrid RF coupler having a third main port, a third isolation port, and a third pair of quadrature ports; and RF filter circuitry coupled to the first pair of quadrature ports, the second pair of quadrature ports, and the third pair of quadrature ports, such that the antenna VSWR RF duplexer provides an antenna VSWR signal. The duplexer control circuitry receives and processes the antenna VSWR signal, which is representative of VSWR mismatch conditions at the first main port.

18 Claims, 16 Drawing Sheets ns systems

ANTENNA VSWR RF DUPLEXER

RELATED APPLICATIONS

This application claims the benefit of U.S. provisional patent application No. 62/189,274, filed Jul. 7, 2015, the disclosure of which is incorporated herein by reference in its entirety.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF multiplexers, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in an RF system that is low cost, small, simple, flexible, efficient, and conforms to wireless communications protocols.

In the RF system, traditional hybrid RF couplers may be used with RF circuits that provide matched impedances to the traditional hybrid RF couplers. Ideally, when a traditional hybrid RF coupler is coupled to an RF antenna, a nominal impedance of the RF antenna is matched to an impedance of the hybrid RF coupler. However, if the impedance of the RF antenna changes, then an impedance mismatch between the RF antenna and the hybrid RF coupler may occur, thereby degrading RF performance. A voltage standing wave ratio (VSWR) at the RF antenna is indicative of impedance changes at the RF antenna. Such changes may occur as a result of external disturbances affecting the antenna, such as a cell phone antenna contacting a user's body, a metal surface, or the like. In this regard, the VSWR at the RF antenna is an indicator of an impedance mismatch at the RF antenna. Therefore, VSWR mismatch conditions at the RF antenna may be indicative of impedance changes at the RF antenna. Such impedance changes may degrade performance of the RF system.

SUMMARY

RF circuitry, which includes an antenna VSWR RF duplexer and duplexer control circuitry, is disclosed according to one embodiment of the present disclosure. The antenna VSWR RF duplexer includes a first hybrid RF coupler having a first main port coupled to an RF antenna, a first isolation port, and a first pair of quadrature ports; a second hybrid RF coupler having a second main port, a second isolation port, and a second pair of quadrature ports; a third hybrid RF coupler having a third main port, a third isolation port, and a third pair of quadrature ports; and RF filter circuitry coupled to the first pair of quadrature ports, the second pair of quadrature ports, and the third pair of quadrature ports, such that the antenna VSWR RF duplexer provides an antenna VSWR signal. The duplexer control circuitry receives and processes the antenna VSWR signal, which is representative of VSWR mismatch conditions at the first main port.

In one embodiment of the RF circuitry, the duplexer control circuitry estimates a VSWR at the RF antenna using the antenna VSWR signal. In an alternate embodiment of the RF circuitry, the duplexer control circuitry determines a first impedance and a second impedance using the antenna VSWR signal. The duplexer control circuitry presents the first impedance to the second isolation port and the second impedance to the third isolation port to decrease an impedance mismatch between the first main port and the RF antenna. In one embodiment of the RF circuitry, the duplexer control circuitry adjusts at least one of the first impedance and the second impedance to increase isolation between the second main port and the third main port.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

Figure 1:
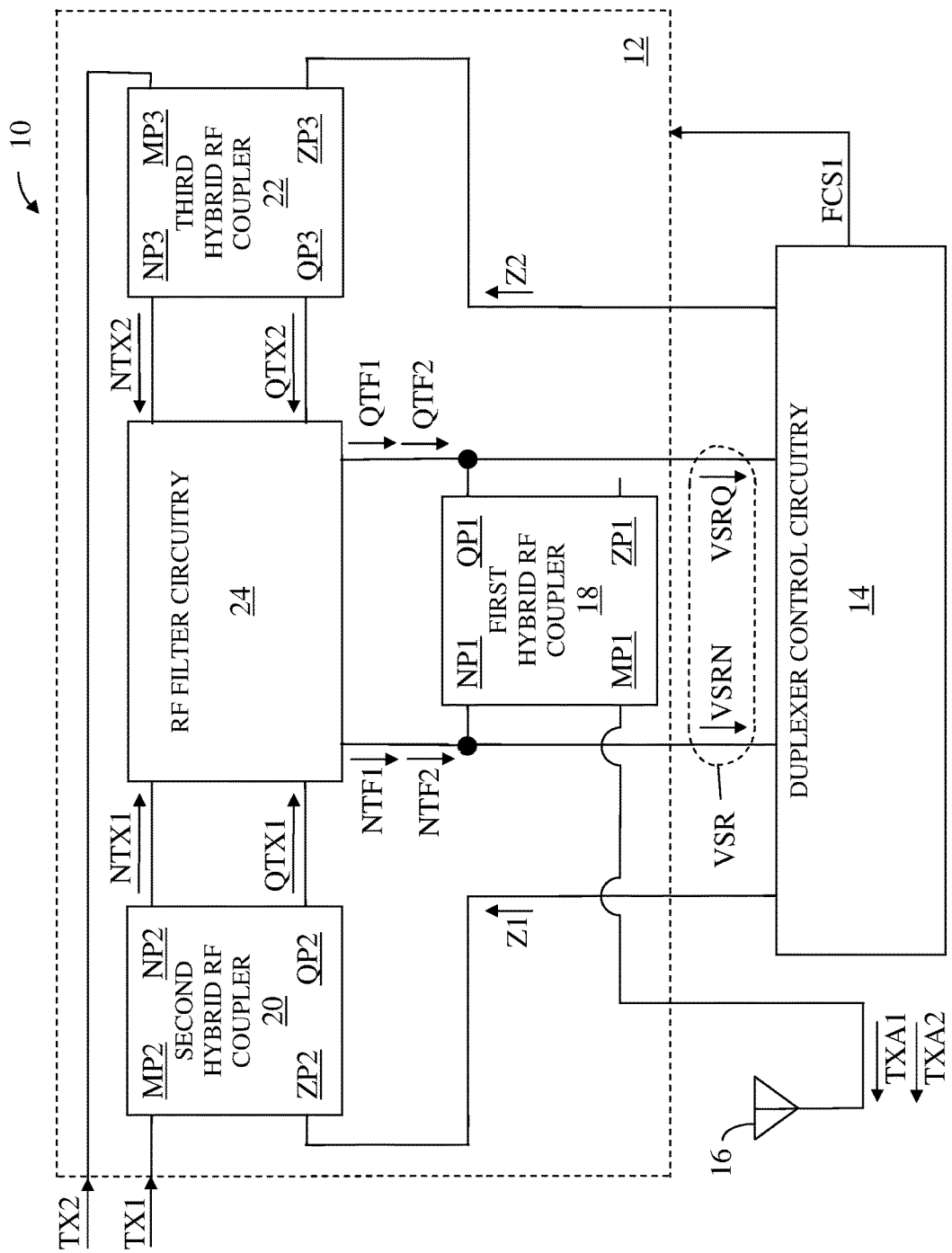
FIG. 1 shows RF circuitry according to one embodiment of the RF circuitry.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

RF circuitry, which includes an antenna VSWR RF duplexer and duplexer control circuitry, is disclosed according to one embodiment of the present disclosure. The antenna VSWR RF duplexer includes a first hybrid RF coupler having a first main port coupled to an RF antenna, a first isolation port, and a first pair of quadrature ports; a second hybrid RF coupler having a second main port, a second isolation port, and a second pair of quadrature ports; a third hybrid RF coupler having a third main port, a third isolation port, and a third pair of quadrature ports; and RF filter circuitry coupled to the first pair of quadrature ports, the second pair of quadrature ports, and the third pair of quadrature ports, such that the antenna VSWR RF duplexer provides an antenna VSWR signal. The duplexer control circuitry receives and processes the antenna VSWR signal, which is representative of VSWR mismatch conditions at the first main port.

In one embodiment of the RF circuitry, the duplexer control circuitry estimates a VSWR at the RF antenna using the antenna VSWR signal. In an alternate embodiment of the RF circuitry, the duplexer control circuitry determines a first impedance and a second impedance using the antenna VSWR signal. The duplexer control circuitry presents the first impedance to the second isolation port and the second impedance to the third isolation port to decrease an impedance mismatch between the first main port and the RF antenna. In one embodiment of the RF circuitry, the duplexer control circuitry adjusts at least one of the first impedance and the second impedance to increase isolation between the second main port and the third main port.

FIG. 1 shows RF circuitry 10 according to one embodiment of the RF circuitry 10. The RF circuitry 10 includes an antenna VSWR RF duplexer 12, duplexer control circuitry 14, and an RF antenna 16. The antenna VSWR RF duplexer 12 illustrated in FIG. 1 is an RF duplexer according to one embodiment of the antenna VSWR RF duplexer 12. The antenna VSWR RF duplexer 12 includes a first hybrid RF coupler 18, a second hybrid RF coupler 20, a third hybrid RF coupler 22, and RF filter circuitry 24.

The first hybrid RF coupler 18 has a first main port MP1, a first isolation port ZP1, a first in-phase port NP1, and a first quadrature-phase port QP1. The second hybrid RF coupler 20 has a second main port MP2, a second isolation port ZP2, a second in-phase port NP2, and a second quadrature-phase port QP2. The third hybrid RF coupler 22 has a third main port MP3, a third isolation port ZP3, a third in-phase port NP3 and a third quadrature-phase port QP3.

In general, in one embodiment of the first hybrid RF coupler 18, the first in-phase port NP1 and the first quadrature-phase port QP1 form a first pair of quadrature ports NP1, QP1. In one embodiment of the second hybrid RF coupler 20, the second in-phase port NP2 and the second quadrature-phase port QP2 form a second pair of quadrature ports NP2, QP2. In one embodiment of the third hybrid RF coupler 22, the third in-phase port NP3 and the third quadrature-phase port QP3 form a third pair of quadrature ports NP3, QP3.

The first main port MP1 is coupled to the RF antenna 16. The first isolation port ZP1 is open. In one embodiment of the RF filter circuitry 24, the RF filter circuitry 24 is coupled to the first pair of quadrature ports, the second pair of quadrature ports, and the third pair of quadrature ports. Specifically, the RF filter circuitry 24 is coupled to the first in-phase port NP1, the first quadrature-phase port QP1, the second in-phase port NP2, the second quadrature-phase port QP2, the third in-phase port NP3, and the third quadrature-phase port QP3. In one embodiment of the RF filter circuitry 24, the RF filter circuitry 24 provides bandpass filtering between the first hybrid RF coupler 18 and the third hybrid RF coupler 22, and further provides bandpass filtering between the first hybrid RF coupler 18 and the second hybrid RF coupler 20.

In one embodiment of the RF circuitry 10, the antenna VSWR RF duplexer 12 receives a first function configuration signal FCS1, such that certain configurations of the antenna VSWR RF duplexer 12 are based on the first function configuration signal FCS1. As such, in one embodiment of the duplexer control circuitry 14, the duplexer control circuitry 14 selects one or more of the certain configurations using the first function configuration signal FCS1.

In one embodiment of the second hybrid RF coupler 20, the second hybrid RF coupler 20 receives a first transmit signal TX1 via the second main port MP2, and then splits and phase-shifts the first transmit signal TX1 to provide a first in-phase transmit signal NTX1 and a first quadrature-phase transmit signal QTX1. In one embodiment of the second hybrid RF coupler 20, the first quadrature-phase transmit signal QTX1 is phase-shifted from the first in-phase transmit signal NTX1 by about 90 degrees.

By splitting the first transmit signal TX1 into the first in-phase transmit signal NTX1 and the first quadrature-phase transmit signal QTX1, the power level of the first transmit signal TX1 is divided into two signals that each have essentially 3 dB less power than the first transmit signal TX1. The reduced power levels may reduce distortion in the transmit signal paths due to non-linear components, such as tuning components, in the transmit signal paths.

The RF filter circuitry 24 receives, filters, and forwards the first in-phase transmit signal NTX1 and the first quadrature-phase transmit signal QTX1 to provide a first filtered in-phase transmit signal NTF1 and a first filtered quadrature-phase transmit signal QTF1, respectively, to the first hybrid RF coupler 18 via the first in-phase port NP1 and the first quadrature-phase port QP1, respectively. The first hybrid RF coupler 18 receives, phase-shifts, and combines the first filtered in-phase transmit signal NTF1 and the first filtered quadrature-phase transmit signal QTF1 to provide a first antenna transmit signal TXA1 to the RF antenna 16 via the first main port MP1.

In one embodiment of the RF filter circuitry 24, the RF filter circuitry 24 filters the first in-phase transmit signal NTX1 and the first quadrature-phase transmit signal QTX1 to substantially pass transmit frequencies of the first in-phase transmit signal NTX1 and the first quadrature-phase transmit signal QTX1, thereby allowing the first in-phase transmit signal NTX1 and the first quadrature-phase transmit signal QTX1 to be forwarded to the first hybrid RF coupler 18.

In one embodiment of the RF filter circuitry 24, the RF filter circuitry 24 filters the first in-phase transmit signal NTX1 and the first quadrature-phase transmit signal QTX1 to substantially stop transmit frequencies of the first in-phase transmit signal NTX1 and the first quadrature-phase transmit signal QTX1, respectively, thereby substantially blocking the first in-phase transmit signal NTX1 and the first quadrature-phase transmit signal QTX1 from the third in-phase port NP3 and the third quadrature-phase port QP3, respectively.

In one embodiment of the RF filter circuitry 24, the RF filter circuitry 24 applies an additional phase-shift between the first in-phase transmit signal NTX1 and the first quadrature-phase transmit signal QTX1 of about 180 degrees, which is a phase inversion, such that any remainders of the first in-phase transmit signal NTX1 and the first quadrature-phase transmit signal QTX1, respectively, that reach the third quadrature-phase port QP3 and the third in-phase port NP3 will be received, phase-shifted, and substantially cancelled by the third hybrid RF coupler 22.

The blocking of the first in-phase transmit signal NTX1 and the first quadrature-phase transmit signal QTX1 from the third quadrature-phase port QP3 and the third in-phase port NP3 combined with the phase inversion described above provides increased isolation of the third main port MP3 from the second main port MP2.

In one embodiment of the third hybrid RF coupler 22, the third hybrid RF coupler 22 receives a second transmit signal TX2 via the third main port MP3, and then splits and phase-shifts the second transmit signal TX2 to provide a second in-phase transmit signal NTX2 and a second quadrature-phase transmit signal QTX2. In one embodiment of the third hybrid RF coupler 22, the second quadrature-phase transmit signal QTX2 is phase-shifted from the second in-phase transmit signal NTX2 by about 90 degrees.

By splitting the second transmit signal TX2 into the second in-phase transmit signal NTX2 and the second quadrature-phase transmit signal QTX2, the power level of the second transmit signal TX2 is divided into two signals that each have essentially 3 dB less power than the second transmit signal TX2. The reduced power levels may reduce distortion in the transmit signal paths due to non-linear components, such as tuning components, in the transmit signal paths.

The RF filter circuitry 24 receives, filters, and forwards the second in-phase transmit signal NTX2 and the second quadrature-phase transmit signal QTX2 to provide a second filtered in-phase transmit signal NTF2 and a second filtered quadrature-phase transmit signal QTF2, respectively, to the first hybrid RF coupler 18 via the first quadrature-phase port QP1 and the first quadrature-phase port QP1, respectively. The first hybrid RF coupler 18 receives, phase-shifts, and combines the second filtered in-phase transmit signal NTF2 and the second filtered quadrature-phase transmit signal QTF2 to provide a second antenna transmit signal TXA2 to the RF antenna 16 via the first main port MP1.

In one embodiment of the RF filter circuitry 24, the RF filter circuitry 24 filters the second in-phase transmit signal NTX2 and the second quadrature-phase transmit signal QTX2 to substantially pass transmit frequencies of the second in-phase transmit signal NTX2 and the second quadrature-phase transmit signal QTX2, respectively, thereby allowing the second in-phase transmit signal NTX2 and the second quadrature-phase transmit signal QTX2 to be forwarded to the first hybrid RF coupler 18.

In one embodiment of the RF filter circuitry 24, the RF filter circuitry 24 filters the second in-phase transmit signal NTX2 and the second quadrature-phase transmit signal QTX2 to substantially stop transmit frequencies of the second in-phase transmit signal NTX2 and the second quadrature-phase transmit signal QTX2, respectively, thereby substantially blocking the second in-phase transmit signal NTX2 and the second quadrature-phase transmit signal QTX2 from the second in-phase port NP2 and the second quadrature-phase port QP2, respectively.

In one embodiment of the RF filter circuitry 24, the RF filter circuitry 24 applies an additional phase-shift between the second in-phase transmit signal NTX2 and the second quadrature-phase transmit signal QTX2 of about 180 degrees, which is a phase inversion, such that any remainders of the second in-phase transmit signal NTX2 and the second quadrature-phase transmit signal QTX2 that reach the second quadrature-phase port QP2 and the second in-phase port NP2 will be received, phase-shifted, and substantially cancelled by the second hybrid RF coupler 20.

The blocking of the second in-phase transmit signal NTX2 and the second quadrature-phase transmit signal QTX2 from the second quadrature-phase port QP2 and the second in-phase port NP2 combined with the phase inversion described above provides increased isolation of the third main port MP3 from the second main port MP2.

In one embodiment of the first hybrid RF coupler 18, the second hybrid RF coupler 20, and the third hybrid RF coupler 22, each of the first hybrid RF coupler 18, the second hybrid RF coupler 20, and the third hybrid RF coupler 22 is associated with a nominal impedance presented at each of its respective ports. The first hybrid RF coupler 18 presents the nominal impedance at the first main port MP1, the first isolation port ZP1, the first in-phase port NP1, and the first quadrature-phase port QP1. The second hybrid RF coupler 20 presents the nominal impedance at the second main port MP2, the second isolation port ZP2, the second in-phase port NP2, and the second quadrature-phase port QP2. The third hybrid RF coupler 22 presents the nominal impedance at the third main port MP3, the third isolation port ZP3, the third in-phase port NP3 and the third quadrature-phase port QP3. In one embodiment of the RF circuitry 10, the nominal impedance is 50 ohms.

However, if any of the ports MP1, ZP1, NP1, QP1, MP2, ZP2, NP2, QP2, MP3, ZP3, NP3, QP3, are coupled to external circuitry that presents a respective impedance other than the nominal impedance, then the impedances presented by any or all of the ports MP1, ZP1, NP1, QP1, MP2, ZP2, NP2, QP2, MP3, ZP3, NP3, QP3 may be altered.

In one embodiment of the antenna VSWR RF duplexer 12, the antenna VSWR RF duplexer 12 operates essentially in ideal conditions, such that the RF antenna 16 presents the nominal impedance to the first main port MP1, the RF filter circuitry 24 presents the nominal impedance to the first in-phase port NP1, the RF filter circuitry 24 presents the nominal impedance to the first quadrature-phase port QP1, an amplitude of the first filtered quadrature-phase transmit signal QTF1 is essentially equal to an amplitude of the first filtered in-phase transmit signal NTF1, an amplitude of the second filtered quadrature-phase transmit signal QTF2 is essentially equal to an amplitude of the second filtered in-phase transmit signal NTF2, the first filtered quadrature-phase transmit signal QTF1 is phase-shifted from the first filtered in-phase transmit signal NTF1 by essentially 90 degrees, and the second filtered quadrature-phase transmit signal QTF2 is essentially phase-shifted from the second filtered in-phase transmit signal NTF2 by essentially 90 degrees.

Under these ideal conditions, the first hybrid RF coupler 18 phase-shifts the first filtered quadrature-phase transmit signal QTF1 to essentially phase-align the first filtered quadrature-phase transmit signal QTF1 with the first filtered in-phase transmit signal NTF1. The first hybrid RF coupler 18 then combines the phase-aligned first filtered quadrature-phase transmit signal QTF1 and first filtered in-phase transmit signal NTF1 to provide the first antenna transmit signal TXA1. Similarly, the first hybrid RF coupler 18 phase-shifts the second filtered quadrature-phase transmit signal QTF2 to essentially phase-align the second filtered quadrature-phase transmit signal QTF2 with the second filtered in-phase transmit signal NTF2. The first hybrid RF coupler 18 then combines the phase-aligned second filtered quadrature-phase transmit signal QTF2 and second filtered in-phase transmit signal NTF2 to provide the second antenna transmit signal TXA2.

However, under VSWR mismatch conditions at the first main port MP1, the RF antenna 16 presents a non-nominal impedance to the first main port MP1, such that impedances presented by first in-phase port NP1, the first quadrature-phase port QP1, or both may be altered due to the non-nominal impedance presented to the first main port MP1. As a result, amplitudes, phases, or both of any or all of the first filtered in-phase transmit signal NTF1, the first filtered quadrature-phase transmit signal QTF1, the second filtered in-phase transmit signal NTF2, and the second filtered quadrature-phase transmit signal QTF2 may vary from nominal values, thereby degrading performance of the antenna VSWR RF duplexer 12.

In this regard, in one embodiment of the antenna VSWR RF duplexer 12, the antenna VSWR RF duplexer 12 provides an antenna VSWR signal VSR to the duplexer control circuitry 14 based on any or all of the first filtered in-phase transmit signal NTF1, the first filtered quadrature-phase transmit signal QTF1, the second filtered in-phase transmit signal NTF2, and the second filtered quadrature-phase transmit signal QTF2. The antenna VSWR signal VSR is representative of VSWR mismatch conditions at the first main port MP1.

In one embodiment of the antenna VSWR signal VSR, the antenna VSWR signal VSR is a quadrature RF signal having an in-phase antenna VSWR signal VSRN and a quadrature-phase antenna VSWR signal VSRQ. In one embodiment of the in-phase antenna VSWR signal VSRN and the quadrature-phase antenna VSWR signal VSRQ, when the in-phase antenna VSWR signal VSRN and the quadrature-phase antenna VSWR signal VSRQ have equal amplitudes; and when the quadrature-phase antenna VSWR signal VSRQ is phase-shifted from the in-phase antenna VSWR signal VSRN by 90 degrees, the in-phase antenna VSWR signal VSRN and the quadrature-phase antenna VSWR signal VSRQ are representative of an ideal impedance match between the RF antenna 16 and the first main port MP1.

In one embodiment of the antenna VSWR RF duplexer 12, the RF filter circuitry 24 and the first hybrid RF coupler 18 provide the antenna VSWR signal VSR using the first pair of quadrature ports NP1, QP1. Specifically, the RF filter circuitry 24 and the first hybrid RF coupler 18 provide the in-phase antenna VSWR signal VSRN using the first in-phase port NP1, and the RF filter circuitry 24 and the first hybrid RF coupler 18 provide the quadrature-phase antenna VSWR signal VSRQ using the first quadrature-phase port QP1.

In one embodiment of the RF circuitry 10, the duplexer control circuitry 14 receives and processes the antenna VSWR signal VSR. In one embodiment of the duplexer control circuitry 14, the duplexer control circuitry 14 estimates a VSWR at the RF antenna 16 using the antenna VSWR signal VSR. In one embodiment of the RF circuitry 10, the duplexer control circuitry 14 presents a first impedance Z1 to the second isolation port ZP2 and a second impedance Z2 to the third isolation port ZP3. The first impedance Z1 may be varied to adjust coupling characteristics of the second hybrid RF coupler 20. The second impedance Z2 may be varied to adjust coupling characteristics of the third hybrid RF coupler 22. As a result, in one embodiment of the RF circuitry 10, the first impedance Z1, the second impedance Z2, or both may be adjusted to compensate for an impedance mismatch presented to the first main port MP1.

In this regard, in one embodiment of the RF circuitry 10, the duplexer control circuitry 14 determines the first impedance Z1, the second impedance Z2, or both using the antenna VSWR signal VSR. In one embodiment of the RF circuitry 10, the duplexer control circuitry 14 presents the first impedance Z1 to the second isolation port ZP2 and the second impedance Z2 to the third isolation port ZP3 to decrease an impedance mismatch between the first main port MP1 and the RF antenna 16. In one embodiment of the RF circuitry 10, the duplexer control circuitry 14 adjusts at least one of the first impedance Z1 and the second impedance Z2 based on the antenna VSWR signal VSR to increase isolation between the second main port MP2 and the third main port MP3.

In one embodiment of the RF circuitry 10, the antenna VSWR RF duplexer 12 processes the first transmit signal TX1 via the second hybrid RF coupler 20, the RF filter circuitry 24, and the first hybrid RF coupler 18 to transmit the first antenna transmit signal TXA1 via the first main port MP1. In one embodiment of the RF circuitry 10, the antenna VSWR RF duplexer 12 processes the second transmit signal TX2 via the third hybrid RF coupler 22, the RF filter circuitry 24, and the first hybrid RF coupler 18 to transmit the second antenna transmit signal TXA2 via the first main port MP1. In one embodiment of the antenna VSWR RF duplexer 12, the antenna VSWR RF duplexer 12 simultaneously transmits the first antenna transmit signal TXA1 and the second antenna transmit signal TXA2, such that the first antenna transmit signal TXA1 and the second antenna transmit signal TXA2 are transmit uplink carrier aggregation (TXULCA) signals.

Figure 2:
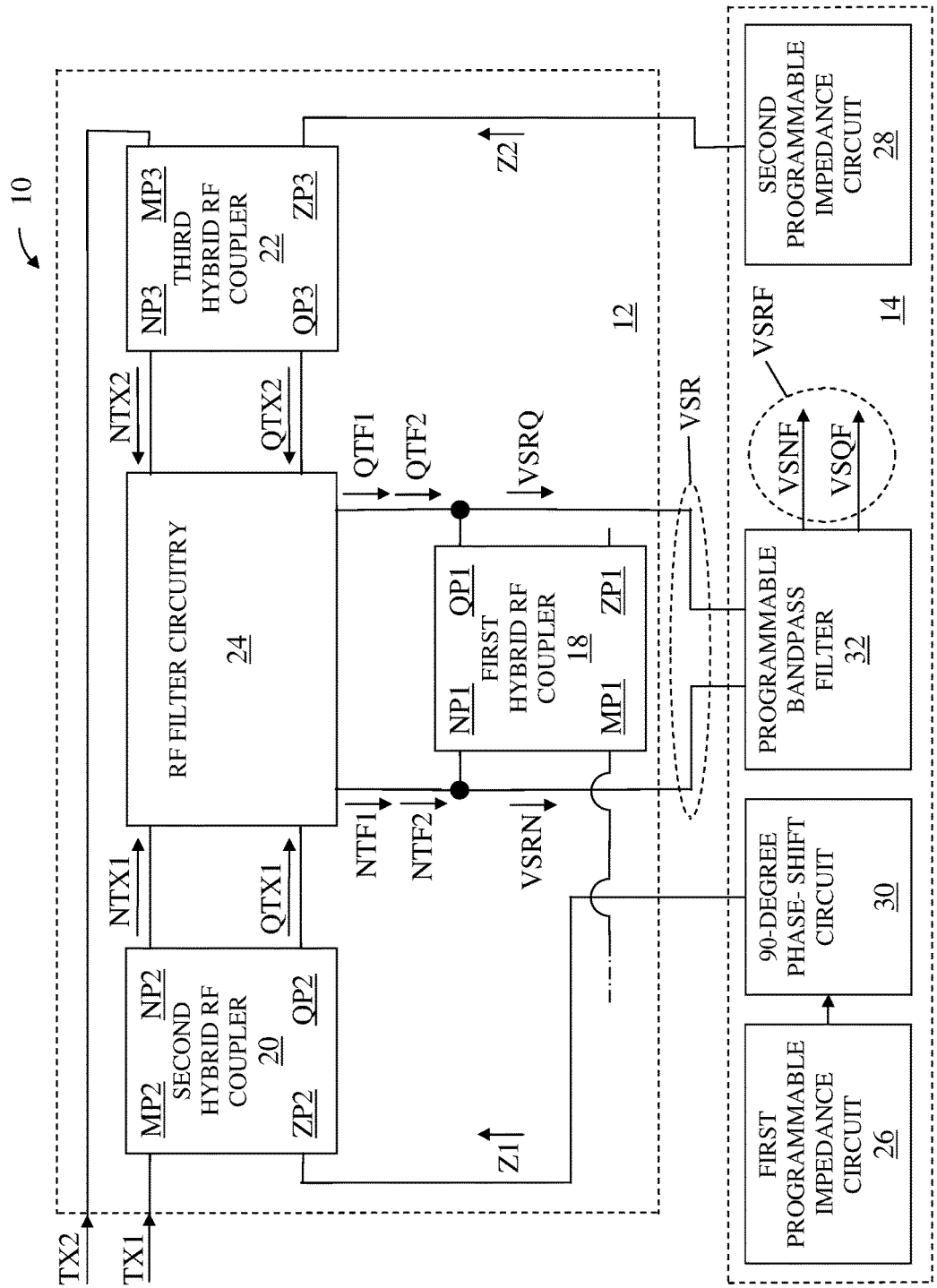
FIG. 2 shows the RF circuitry according to an alternate embodiment of the RF circuitry.

FIG. 2 shows the RF circuitry 10 according to an alternate embodiment of the RF circuitry 10. The RF circuitry 10 illustrated in FIG. 2 is similar to the RF circuitry 10 illustrated in FIG. 1, except the RF circuitry 10 illustrated in FIG. 2 shows details of the duplexer control circuitry 14, and the RF antenna 16 is not shown to simplify FIG. 2.

In one embodiment of the duplexer control circuitry 14, the duplexer control circuitry 14 includes a first programmable impedance circuit 26, a second programmable impedance circuit 28, a 90-degree phase-shift circuit 30, and a programmable bandpass filter 32. The 90-degree phase-shift circuit 30 is coupled between the first programmable impedance circuit 26 and the second isolation port ZP2, such that the 90-degree phase-shift circuit 30 and the first programmable impedance circuit 26 present the first impedance Z1 to the second isolation port ZP2 based on the antenna VSWR signal VSR. The second programmable impedance circuit 28 presents the second impedance Z2 to the third isolation port ZP3 based on the antenna VSWR signal VSR.

In one embodiment of the duplexer control circuitry 14, the programmable bandpass filter 32 receives and filters the antenna VSWR signal VSR to provide a filtered antenna VSWR signal VSRF. In one embodiment of the filtered antenna VSWR signal VSRF, the filtered antenna VSWR signal VSRF includes an in-phase filtered antenna VSWR signal VSNF and a quadrature-phase filtered antenna VSWR signal VSQF. In this regard, in one embodiment of the duplexer control circuitry 14, the programmable bandpass filter 32 receives and filters the in-phase antenna VSWR signal VSRN to provide the in-phase filtered antenna VSWR signal VSNF, and further receives and filters the quadrature-phase antenna VSWR signal VSRQ to provide the quadrature-phase filtered antenna VSWR signal VSQF.

In one embodiment of the duplexer control circuitry 14, the duplexer control circuitry 14 determines the first impedance Z1, the second impedance Z2, or both using the filtered antenna VSWR signal VSRF. In one embodiment of the duplexer control circuitry 14, a carrier frequency of the filtered antenna VSWR signal VSRF is essentially equal to a carrier frequency of the first transmit signal TX1. In an alternate embodiment of the duplexer control circuitry 14, the carrier frequency of the filtered antenna VSWR signal VSRF is essentially equal to a carrier frequency of the second transmit signal TX2.

Figure 3:
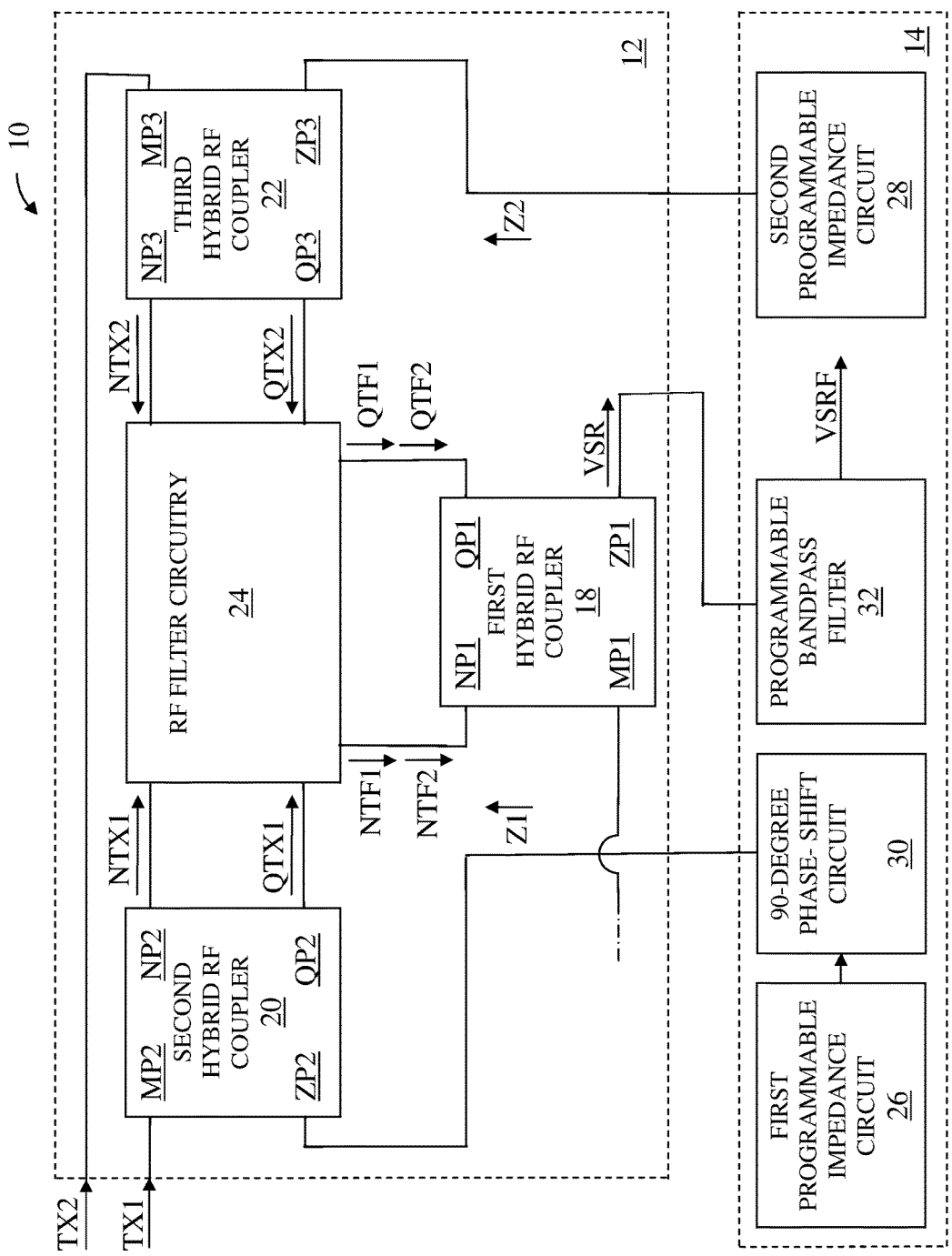
FIG. 3 shows the RF circuitry according to an additional embodiment of the RF circuitry.

FIG. 3 shows the RF circuitry 10 according to an additional embodiment of the RF circuitry 10. The RF circuitry 10 illustrated in FIG. 3 is similar to the RF circuitry 10 illustrated in FIG. 2, except in the RF circuitry 10 illustrated in FIG. 3, the first hybrid RF coupler 18 provides the antenna VSWR signal VSR via the first isolation port ZP1. In one embodiment of the antenna VSWR signal VSR, the antenna VSWR signal VSR is a single-ended signal. Therefore, in one embodiment of the programmable bandpass filter 32, the programmable bandpass filter 32 receives and filters the antenna VSWR signal VSR to provide the filtered antenna VSWR signal VSRF. Additionally, in one embodiment of the filtered antenna VSWR signal VSRF, the filtered antenna VSWR signal VSRF is a single-ended signal.

In this regard, the first hybrid RF coupler 18 receives, phase-shifts, and combines the in-phase antenna VSWR signal VSRN (FIG. 2) and the quadrature-phase antenna VSWR signal VSRQ (FIG. 2) via the first in-phase port NP1 and the first quadrature-phase port QP1, respectively, to provide the antenna VSWR signal VSR via the first isolation port ZP1. When the in-phase antenna VSWR signal VSRN (FIG. 2) and the quadrature-phase antenna VSWR signal VSRQ (FIG. 2) are representative of an ideal impedance match between the RF antenna 16 and the first main port MP1, the first hybrid RF coupler 18 phase-shifts and combines the in-phase antenna VSWR signal VSRN (FIG. 2) and the quadrature-phase antenna VSWR signal VSRQ (FIG. 2), such that an amplitude of the antenna VSWR signal VSR is essentially zero. As a result, an amplitude and a phase of the antenna VSWR signal VSR is representative of the impedance mismatch between the first main port MP1 and the RF antenna 16.

Figure 4:
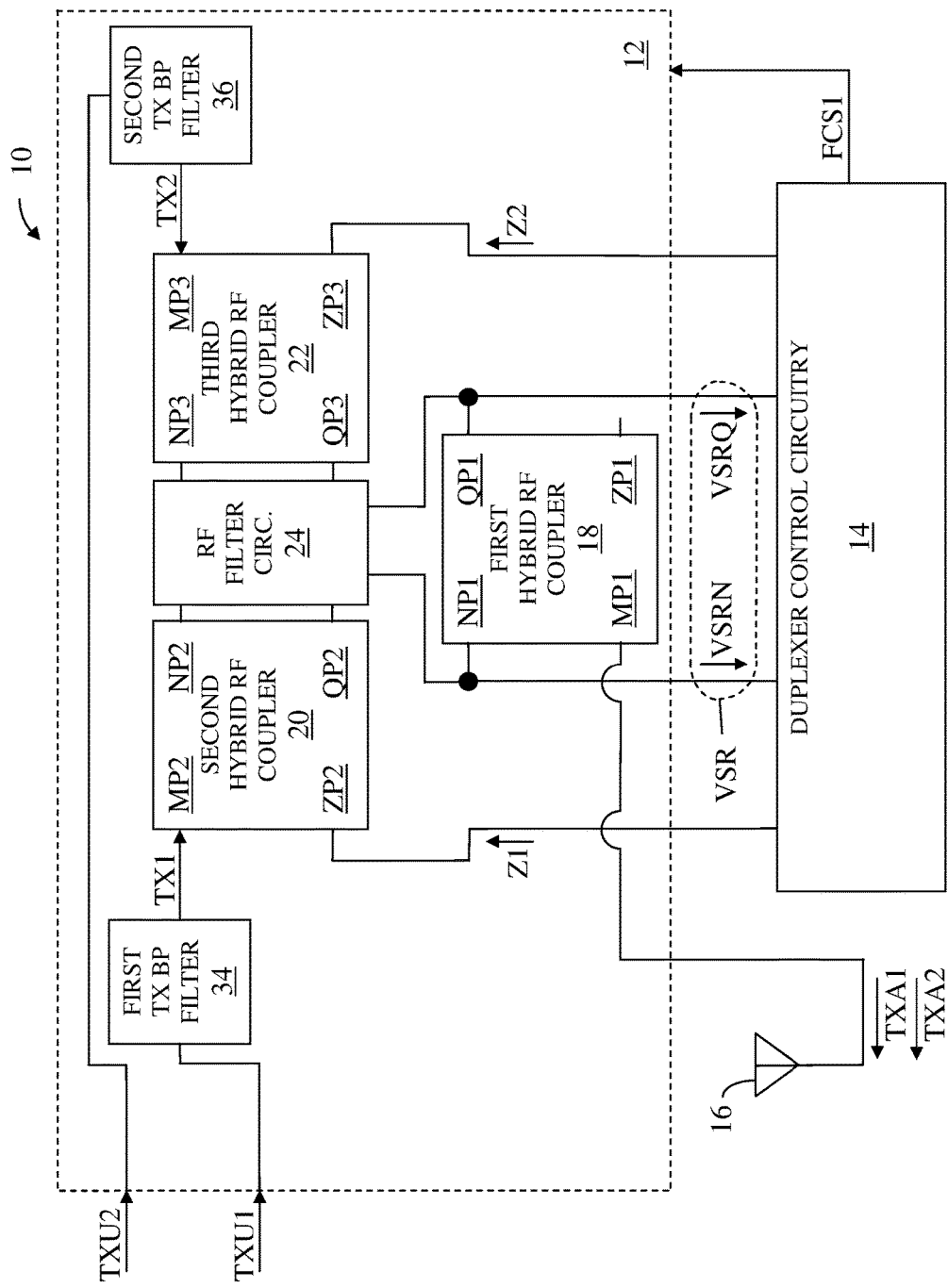
FIG. 4 shows the RF circuitry according to another embodiment of the RF circuitry.

FIG. 4 shows the RF circuitry 10 according to another embodiment of the RF circuitry 10. The RF circuitry 10 illustrated in FIG. 4 is similar to the RF circuitry 10 illustrated in FIG. 1, except in the RF circuitry 10 illustrated in FIG. 4, the antenna VSWR RF duplexer 12 further includes a first transmit bandpass filter 34 and a second transmit bandpass filter 36.

The first transmit bandpass filter 34 receives and filters a first upstream transmit signal TXU1 to provide the first transmit signal TX1 to the second hybrid RF coupler 20. Specifically, the first transmit bandpass filter 34 provides the first transmit signal TX1 to the second main port MP2. The second transmit bandpass filter 36 receives and filters a second upstream transmit signal TXU2 to provide the second transmit signal TX2 to the third hybrid RF coupler 22. Specifically, the second transmit bandpass filter 36 provides the second transmit signal TX2 to the third main port MP3.

In one embodiment of the first transmit bandpass filter 34, the first transmit bandpass filter 34 substantially passes a frequency of the first transmit signal TX1 and substantially stops frequencies of the second transmit signal TX2. Conversely, in one embodiment of the second transmit bandpass filter 36, the second transmit bandpass filter 36 substantially passes a frequency of the second transmit signal TX2 and substantially stops frequencies of the first transmit signal TX1. In one embodiment of the first transmit bandpass filter 34, a frequency response of the first transmit bandpass filter 34 is tunable based on the first function configuration signal FCS1. In one embodiment of the second transmit bandpass filter 36, a frequency response of the second transmit bandpass filter 36 is tunable based on the first function configuration signal FCS1. In an alternate embodiment of the RF circuitry 10, the first transmit bandpass filter 34, the second transmit bandpass filter 36, or both are omitted.

Figure 5:
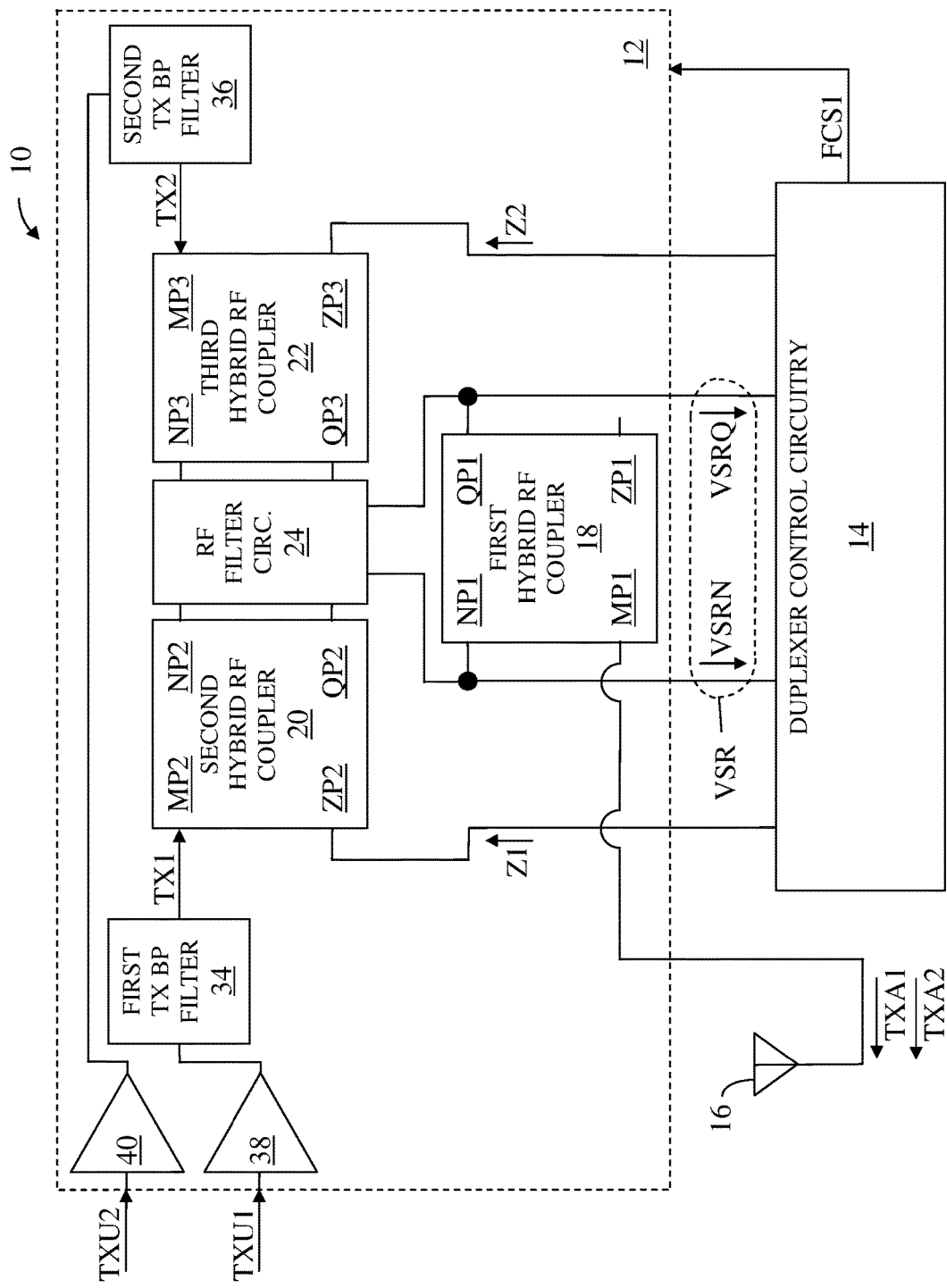
FIG. 5 shows the RF circuitry according to a further embodiment of the RF circuitry.

FIG. 5 shows the RF circuitry 10 according to a further embodiment of the RF circuitry 10. The RF circuitry 10 illustrated in FIG. 5 is similar to the RF circuitry 10 illustrated in FIG. 4, except in the RF circuitry 10 illustrated in FIG. 5, the antenna VSWR RF duplexer 12 further includes a first RF power amplifier (PA) 38 and a second RF PA 40. The first transmit bandpass filter 34 is coupled between an output from the first RF PA 38 and the second hybrid RF coupler 20. As such, the first RF PA 38 and the first transmit bandpass filter 34 receive, amplify, and filter the first upstream transmit signal TXU1 to provide the first transmit signal TX1 to the second main port MP2.

The second transmit bandpass filter 36 is coupled between an output from the second RF PA 40 and the third hybrid RF coupler 22. As such, the second RF PA 40 and the second transmit bandpass filter 36 receive, amplify, and filter the second upstream transmit signal TXU2 to provide the second transmit signal TX2 to the third main port MP3. In an alternate embodiment of the RF circuitry 10, the first RF PA 38, the second RF PA 40, or both are omitted.

Figure 6:
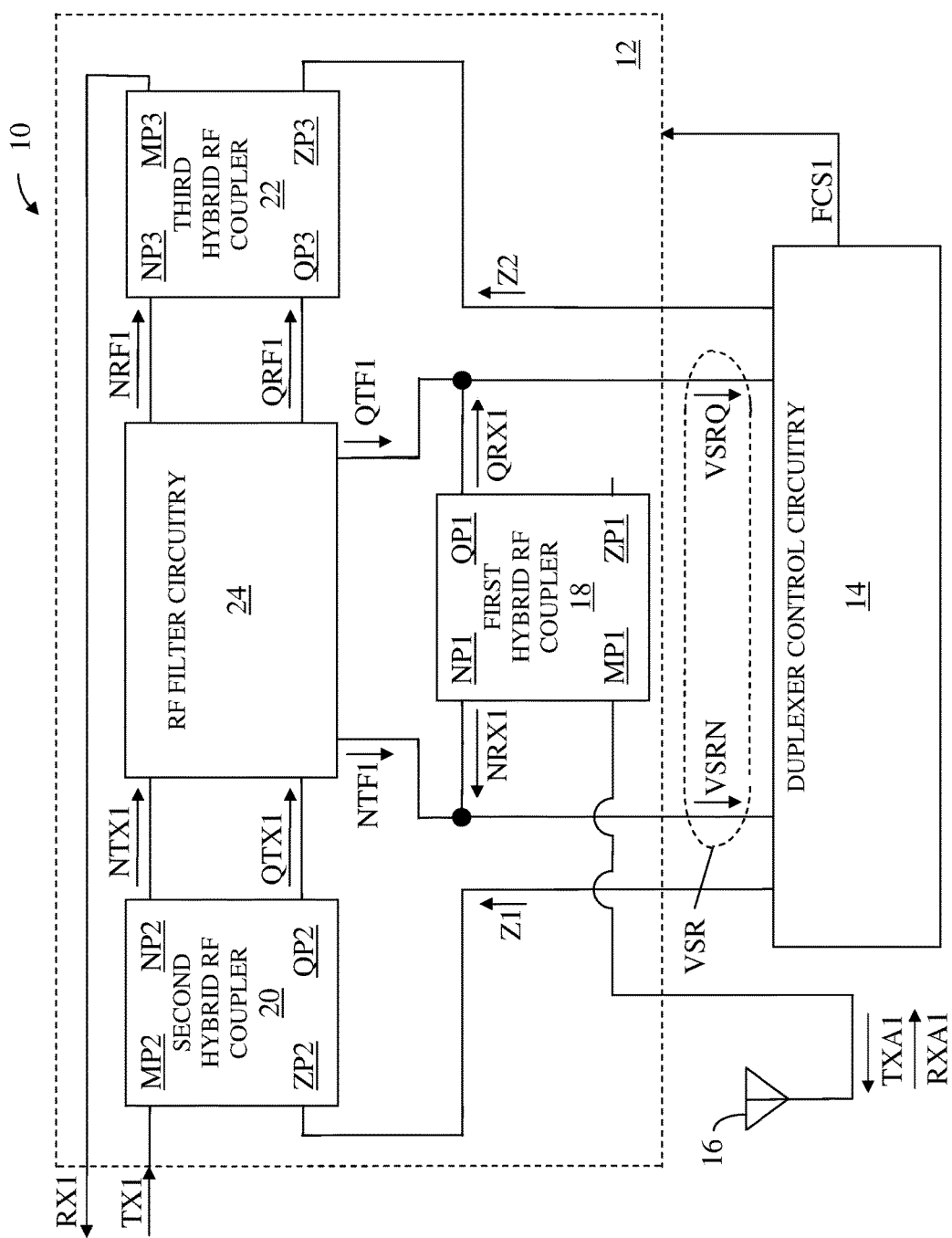
FIG. 6 shows the RF circuitry according to one embodiment of the RF circuitry.

FIG. 6 shows the RF circuitry 10 according to one embodiment of the RF circuitry 10. The RF circuitry 10 illustrated in FIG. 6 is similar to the RF circuitry 10 illustrated in FIG. 1, except instead of providing the first antenna transmit signal TXA1 and the second antenna transmit signal TXA2 to the RF antenna 16 as illustrated in FIG. 1, the antenna VSWR RF duplexer 12 illustrated in FIG. 6 provides the first antenna transmit signal TXA1 to the RF antenna 16 and receives a first antenna receive signal RXA1.

In this regard, in one embodiment of the second hybrid RF coupler 20, the second hybrid RF coupler 20 receives the first transmit signal TX1 via the second main port MP2, and then splits and phase-shifts the first transmit signal TX1 to provide the first in-phase transmit signal NTX1 and the first quadrature-phase transmit signal QTX1. In one embodiment of the second hybrid RF coupler 20, the first quadrature-phase transmit signal QTX1 is phase-shifted from the first in-phase transmit signal NTX1 by about 90 degrees.

By splitting the first transmit signal TX1 into the first in-phase transmit signal NTX1 and the first quadrature-phase transmit signal QTX1, the power level of the first transmit signal TX1 is divided into two signals that each have essentially 3 dB less power than the first transmit signal TX1. The reduced power levels may reduce distortion in the transmit signal paths due to non-linear components, such as tuning components, in the transmit signal paths.

The RF filter circuitry 24 receives, filters, and forwards the first in-phase transmit signal NTX1 and the first quadrature-phase transmit signal QTX1 to provide the first filtered in-phase transmit signal NTF1 and the first filtered quadrature-phase transmit signal QTF1, respectively, to the first hybrid RF coupler 18 via the first in-phase port NP1 and the first quadrature-phase port QP1, respectively. The first hybrid RF coupler 18 receives, phase-shifts, and combines the first filtered in-phase transmit signal NTF1 and the first filtered quadrature-phase transmit signal QTF1 to provide the first antenna transmit signal TXA1 to the RF antenna 16 via the first main port MP1.

In one embodiment of the RF filter circuitry 24, the RF filter circuitry 24 filters the first in-phase transmit signal NTX1 and the first quadrature-phase transmit signal QTX1 to substantially pass transmit frequencies of the first in-phase transmit signal NTX1 and the first quadrature-phase transmit signal QTX1, thereby allowing the first in-phase transmit signal NTX1 and the first quadrature-phase transmit signal QTX1 to be forwarded to the first hybrid RF coupler 18.

In one embodiment of the RF filter circuitry 24, the RF filter circuitry 24 filters the first in-phase transmit signal NTX1 and the first quadrature-phase transmit signal QTX1 to substantially stop transmit frequencies of the first in-phase transmit signal NTX1 and the first quadrature-phase transmit signal QTX1, respectively, thereby substantially blocking the first in-phase transmit signal NTX1 and the first quadrature-phase transmit signal QTX1 from the third in-phase port NP3 and the third quadrature-phase port QP3, respectively.

In one embodiment of the RF filter circuitry 24, the RF filter circuitry 24 applies an additional phase-shift between the first in-phase transmit signal NTX1 and the first quadrature-phase transmit signal QTX1 of about 180 degrees, which is a phase inversion, such that any remainders of the first in-phase transmit signal NTX1 and the first quadrature-phase transmit signal QTX1, respectively, that reach the third quadrature-phase port QP3 and the third in-phase port NP3 will be received, phase-shifted, and substantially cancelled by the third hybrid RF coupler 22.

The blocking of the first in-phase transmit signal NTX1 and the first quadrature-phase transmit signal QTX1 from the third quadrature-phase port QP3 and the third in-phase port NP3 combined with the phase inversion described above provides increased isolation of the third main port MP3 from the second main port MP2.

In one embodiment of the RF circuitry 10, the first hybrid RF coupler 18 receives the first antenna receive signal RXA1 via the RF antenna 16, and then splits and phase-shifts the first antenna receive signal RXA1 to provide a first in-phase receive signal NRX1 and a first quadrature-phase receive signal QRX1. In one embodiment of the first hybrid RF coupler 18, the first quadrature-phase receive signal QRX1 is phase-shifted from the first in-phase receive signal NRX1 by about 90 degrees.

The RF filter circuitry 24 receives, filters, and forwards the first in-phase receive signal NRX1 and the first quadrature-phase receive signal QRX1 to provide a first filtered in-phase receive signal NRF1 and a first filtered quadrature-phase receive signal QRF1 to the third hybrid RF coupler 22 via the third in-phase port NP3 and the third quadrature-phase port QP3, respectively. The third hybrid RF coupler 22 receives, phase-shifts, and combines the first filtered in-phase receive signal NRF1 and the first filtered quadrature-phase receive signal QRF1 to provide a first receive signal RX1 via the third main port MP3. In one embodiment of the third hybrid RF coupler 22, after the third hybrid RF coupler 22 has phase-shifted the first filtered in-phase receive signal NRF1 and first filtered quadrature-phase receive signal QRF1, the phase-shifted first filtered in-phase receive signal NRF1 and first filtered quadrature-phase receive signal QRF1 are about phase-aligned with one another.

In one embodiment of the RF filter circuitry 24, the RF filter circuitry 24 filters the first in-phase receive signal NRX1 and the first quadrature-phase receive signal QRX1 to substantially pass receive frequencies of the first in-phase receive signal NRX1 and the first quadrature-phase receive signal QRX1, thereby allowing the first in-phase receive signal NRX1 and the first quadrature-phase receive signal QRX1 to be forwarded to the third hybrid RF coupler 22.

In one embodiment of the RF filter circuitry 24, the RF filter circuitry 24 filters the first in-phase receive signal NRX1 and the first quadrature-phase receive signal QRX1 to substantially stop receive frequencies of the first in-phase receive signal NRX1 and the first quadrature-phase receive signal QRX1, thereby substantially blocking the first in-phase receive signal NRX1 and the first quadrature-phase receive signal QRX1 from the second in-phase port NP2 and the second quadrature-phase port QP2.

In one embodiment of the RF filter circuitry 24, the RF filter circuitry 24 applies an additional phase-shift between the first filtered in-phase receive signal NRF1 and the first filtered quadrature-phase receive signal QRF1 of about 180 degrees, which is a phase inversion, such that any remainders of the first filtered in-phase receive signal NRF1 and the first filtered quadrature-phase receive signal QRF1 that reach the second in-phase port NP2 and the second quadrature-phase port QP2 will be received, phase-shifted, and substantially cancelled by the second hybrid RF coupler 20.

The blocking of the first in-phase receive signal NRX1 and the first quadrature-phase receive signal QRX1 from the first in-phase port NP1 and the first quadrature-phase port QP1 combined with the phase inversion described above provide increased isolation of the second main port MP2 from the first in-phase receive signal NRX1 and the first quadrature-phase receive signal QRX1. In general, the increased isolation during receptions of RF signals effectively isolates the second main port MP2 from the third main port MP3.

In this regard, during both transmission and reception of RF signals, the second main port MP2 and the third main port MP3 are effectively isolated from one another due to the increased isolation. As a result, during high VSWR conditions at the RF antenna 16 due to antenna mismatch, the increased isolation may allow the RF circuitry 10 to operate effectively. In one embodiment of the RF circuitry 10, the RF circuitry 10 may operate effectively with a VSWR of three to one.

In one embodiment of the antenna VSWR RF duplexer 12, the RF filter circuitry 24 and the first hybrid RF coupler 18 provide the antenna VSWR signal VSR using the first pair of quadrature ports NP1, QP1. Specifically, the RF filter circuitry 24 and the first hybrid RF coupler 18 provide the in-phase antenna VSWR signal VSRN using the first in-phase port NP1, and the RF filter circuitry 24 and the first hybrid RF coupler 18 provide the quadrature-phase antenna VSWR signal VSRQ using the first quadrature-phase port QP1.

In one embodiment of the duplexer control circuitry 14, the duplexer control circuitry 14 determines the first impedance Z1, the second impedance Z2, or both using the filtered antenna VSWR signal VSRF (FIG. 2). In one embodiment of the duplexer control circuitry 14, the carrier frequency of the filtered antenna VSWR signal VSRF (FIG. 2) is essentially equal to a carrier frequency of the first transmit signal TX1. In an alternate embodiment of the duplexer control circuitry 14, the carrier frequency of the filtered antenna VSWR signal VSRF (FIG. 2) is essentially equal to a carrier frequency of the first receive signal RX1.

In general, in one embodiment of the antenna VSWR RF duplexer 12, the antenna VSWR RF duplexer 12 processes the first transmit signal TX1 via the second hybrid RF coupler 20, the RF filter circuitry 24, and the first hybrid RF coupler 18 to transmit the first antenna transmit signal TXA1 via the first main port MP1. In one embodiment of the antenna VSWR RF duplexer 12, the antenna VSWR RF duplexer 12 receives and processes the first antenna receive signal RXA1 via the first hybrid RF coupler 18, the RF filter circuitry 24, and the third hybrid RF coupler 22 to provide the first receive signal RX1.

Figure 7:
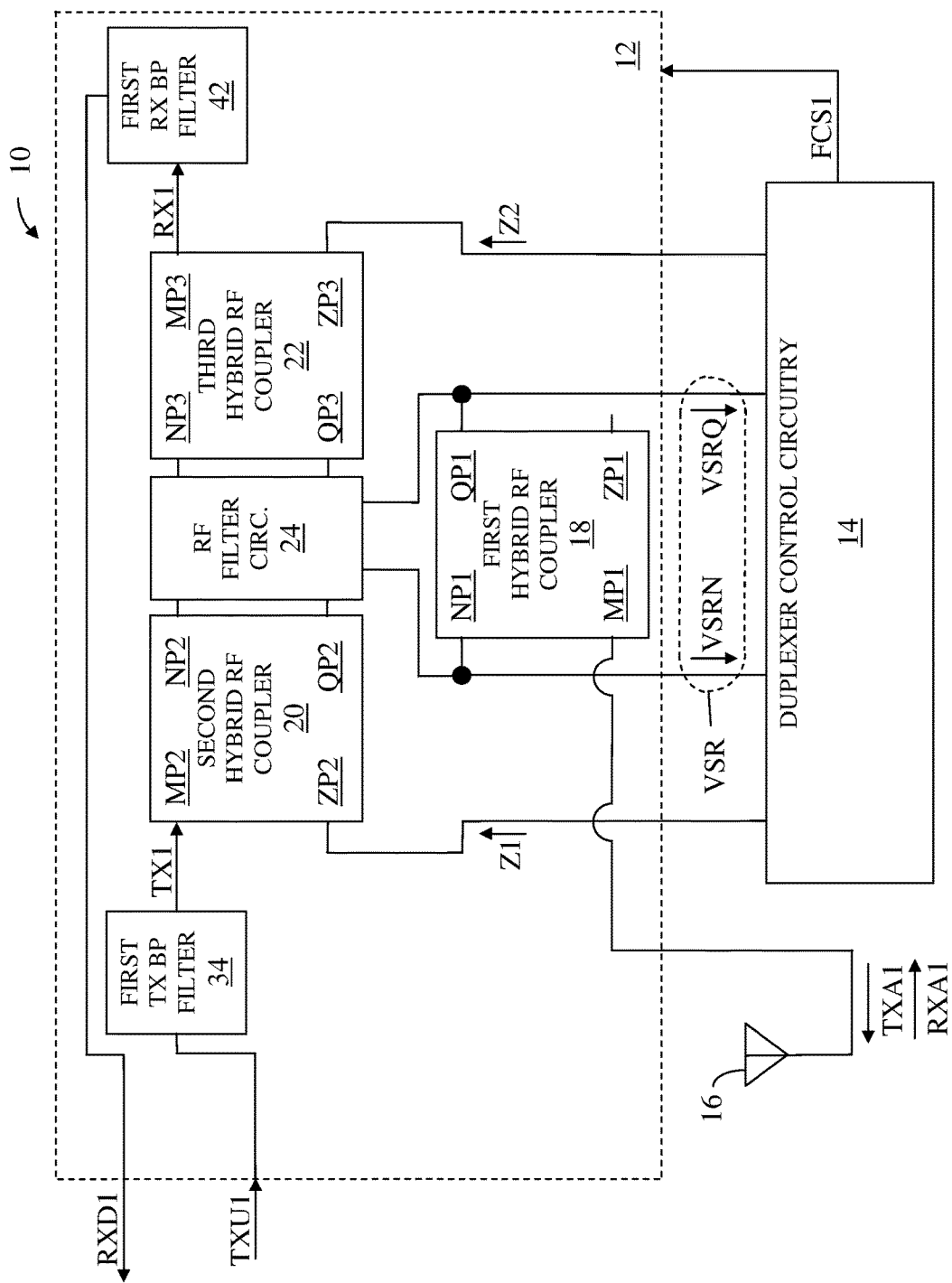
FIG. 7 shows the RF circuitry according to another embodiment of the RF circuitry.

FIG. 7 shows the RF circuitry 10 according to another embodiment of the RF circuitry 10. The RF circuitry 10 illustrated in FIG. 7 is similar to the RF circuitry 10 illustrated in FIG. 6, except in the RF circuitry 10 illustrated in FIG. 7, the antenna VSWR RF duplexer 12 further includes the first transmit bandpass filter 34 and a first receive bandpass filter 42.

The first transmit bandpass filter 34 receives and filters the first upstream transmit signal TXU1 to provide the first transmit signal TX1 to the second hybrid RF coupler 20. Specifically, the first transmit bandpass filter 34 provides the first transmit signal TX1 to the second main port MP2. The first receive bandpass filter 42 receives and filters the first receive signal RX1 from the third hybrid RF coupler 22 to provide a first downstream receive signal RXD1. Specifically, the first receive bandpass filter 42 receives the first receive signal RX1 from the third main port MP3.

In one embodiment of the first transmit bandpass filter 34, the first transmit bandpass filter 34 substantially passes a frequency of the first transmit signal TX1 and substantially stops frequencies of the first receive signal RX1. Conversely, in one embodiment of the first receive bandpass filter 42, the first receive bandpass filter 42 substantially passes a frequency of the first receive signal RX1 and substantially stops frequencies of the first transmit signal TX1. In one embodiment of the first transmit bandpass filter 34, a frequency response of the first transmit bandpass filter 34 is tunable based on the first function configuration signal FCS1. In one embodiment of the first receive bandpass filter 42, a frequency response of the first receive bandpass filter 42 is tunable based on the first function configuration signal FCS1. In an alternate embodiment of the RF circuitry 10, the first transmit bandpass filter 34, the first receive bandpass filter 42, or both are omitted.

Figure 8:
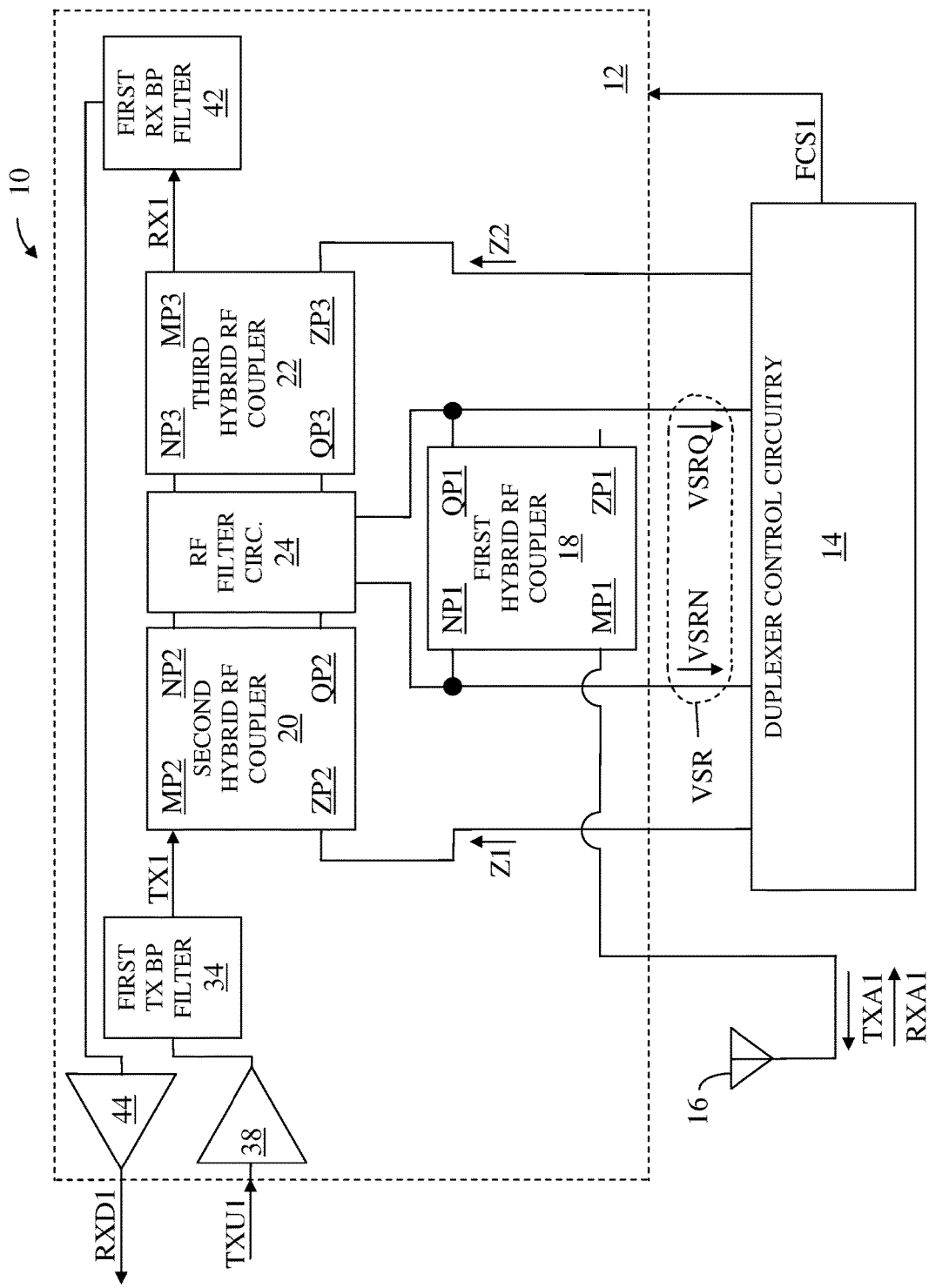
FIG. 8 shows the RF circuitry according to an alternate embodiment of the RF circuitry.

FIG. 8 shows the RF circuitry 10 according to an alternate embodiment of the RF circuitry 10. The RF circuitry 10 illustrated in FIG. 8 is similar to the RF circuitry 10 illustrated in FIG. 7, except in the RF circuitry 10 illustrated in FIG. 8, the antenna VSWR RF duplexer 12 further includes the first RF PA 38 and an RF LNA 44. The first transmit bandpass filter 34 is coupled between an output from the first RF PA 38 and the second hybrid RF coupler 20. As such, the first RF PA 38 and the first transmit bandpass filter 34 receive, amplify, and filter the first upstream transmit signal TXU1 to provide the first transmit signal TX1 to the second main port MP2. The first receive bandpass filter 42 and the RF LNA 44 receive, filter, and amplify the first receive signal RX1 to provide a first downstream receive signal RXD1. In an alternate embodiment of the RF circuitry 10, any or all of the first transmit bandpass filter 34, the first RF PA 38, the first receive bandpass filter 42, and the RF LNA 44 are omitted.

Figure 9:
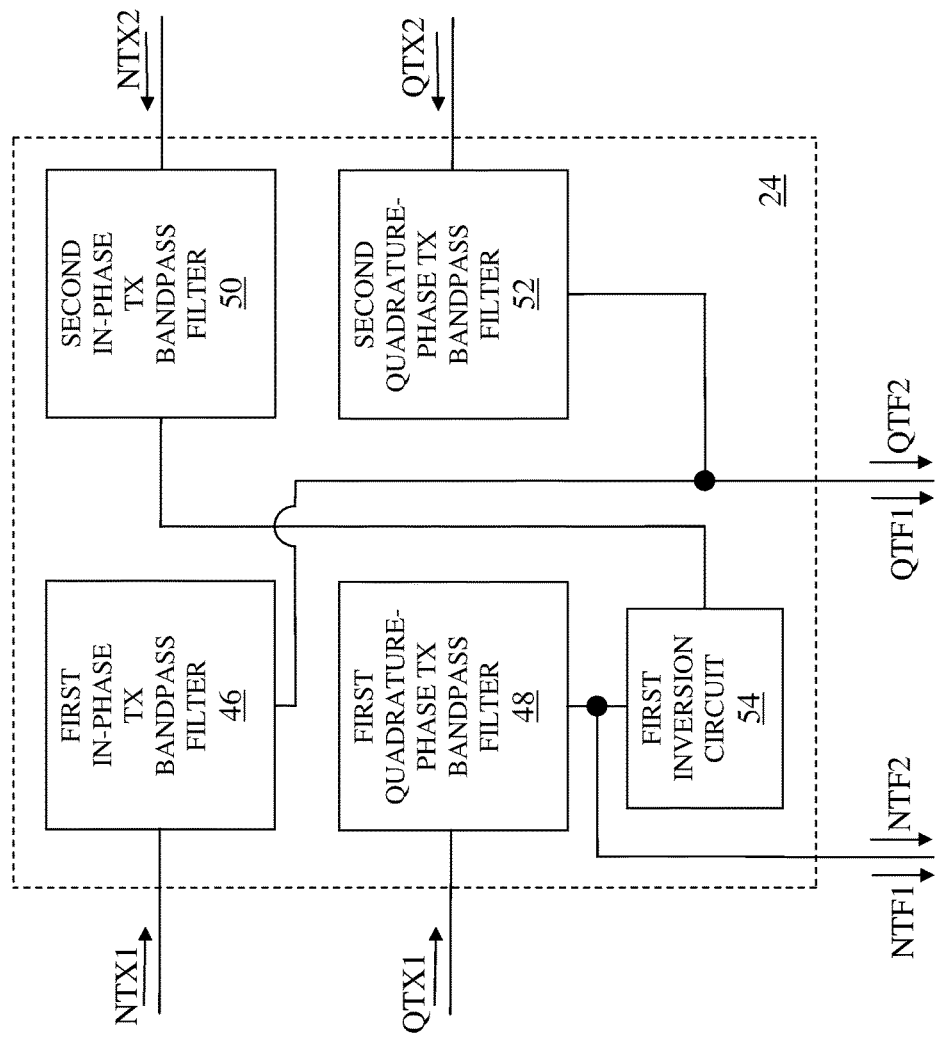
FIG. 9 shows details of RF filter circuitry illustrated in FIG. 1 according to one embodiment of the RF filter circuitry.

FIG. 9 shows details of RF filter circuitry 24 illustrated in FIG. 1 according to one embodiment of the RF filter circuitry 24. The RF filter circuitry 24 includes a first in-phase transmit bandpass filter 46, a first quadrature-phase transmit bandpass filter 48, a second in-phase transmit bandpass filter 50, a second quadrature-phase transmit bandpass filter 52, and a first inversion circuit 54.

The first in-phase transmit bandpass filter 46 is coupled between the first quadrature-phase port QP1 (FIG. 1) and the second in-phase port NP2 (FIG. 1). The second in-phase transmit bandpass filter 50 and the first inversion circuit 54 are coupled in series between the first in-phase port NP1 (FIG. 1) and the third in-phase port NP3 (FIG. 1). The first quadrature-phase transmit bandpass filter 48 is coupled between the first in-phase port NP1 (FIG. 1) and the second quadrature-phase port QP2 (FIG. 1). The second quadrature-phase transmit bandpass filter 52 is coupled between the first quadrature-phase port QP1 (FIG. 1) and the third quadrature-phase port QP3 (FIG. 1).

In one embodiment of the RF filter circuitry 24, the first in-phase transmit bandpass filter 46 receives and filters the first in-phase transmit signal NTX1 to provide the first filtered quadrature-phase transmit signal QTF1. The first quadrature-phase transmit bandpass filter 48 receives and filters the first quadrature-phase transmit signal QTX1 to provide the first filtered in-phase transmit signal NTF1. The second in-phase transmit bandpass filter 50 and the first inversion circuit 54 receive, filter, and invert the second in-phase transmit signal NTX2 to provide the second filtered in-phase transmit signal NTF2. The second quadrature-phase transmit bandpass filter 52 receives and filters the second quadrature-phase transmit signal QTX2 to provide the second filtered quadrature-phase transmit signal QTF2.

Figure 10:
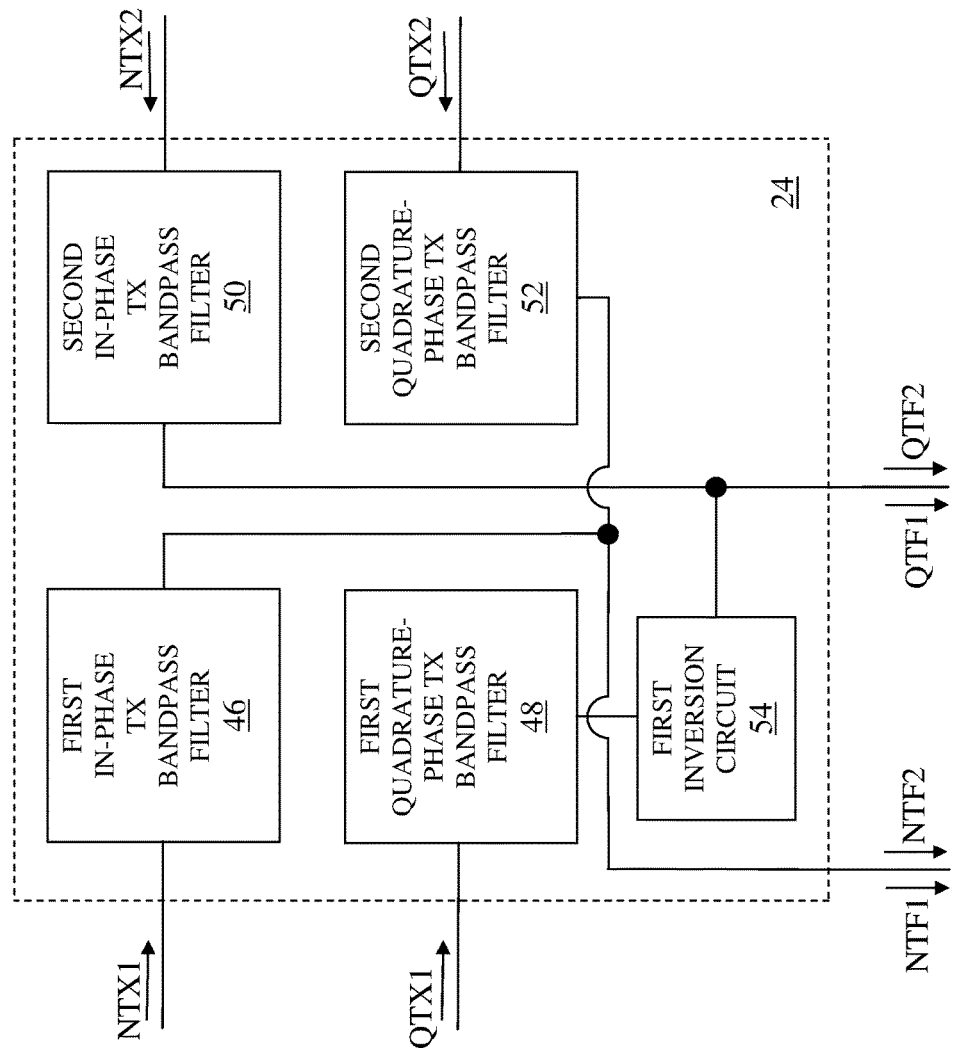
FIG. 10 shows details of the RF filter circuitry illustrated in FIG. 1 according to an alternate embodiment of the RF filter circuitry.

FIG. 10 shows details of the RF filter circuitry 24 illustrated in FIG. 1 according to an alternate embodiment of the RF filter circuitry 24. The RF filter circuitry 24 includes a first in-phase transmit bandpass filter 46, a first quadrature-phase transmit bandpass filter 48, a second in-phase transmit bandpass filter 50, a second quadrature-phase transmit bandpass filter 52, and a first inversion circuit 54.

The first in-phase transmit bandpass filter 46 is coupled between the first in-phase port NP1 (FIG. 1) and the second in-phase port NP2 (FIG. 1). The second in-phase transmit bandpass filter 50 is coupled between the first quadrature-phase port QP1 (FIG. 1) and the third in-phase port NP3 (FIG. 1). The first quadrature-phase transmit bandpass filter 48 and the first inversion circuit 54 are coupled in series between the first quadrature-phase port QP1 (FIG. 1) and the second quadrature-phase port QP2 (FIG. 1). The second quadrature-phase transmit bandpass filter 52 is coupled between the first in-phase port NP1 (FIG. 1) and the third quadrature-phase port QP3 (FIG. 1).

The first in-phase transmit bandpass filter 46 receives and filters the first in-phase transmit signal NTX1 to provide the first filtered in-phase transmit signal NTF1. The second in-phase transmit bandpass filter 50 receives and filters the second in-phase transmit signal NTX2 to provide the second filtered quadrature-phase transmit signal QTF2. The first quadrature-phase transmit bandpass filter 48 and the first inversion circuit 54 receive, filter, and invert the first quadrature-phase transmit signal QTX1 to provide the first filtered quadrature-phase transmit signal QTF1. The second quadrature-phase transmit bandpass filter 52 receives and filters the second quadrature-phase transmit signal QTX2 to provide the second filtered in-phase transmit signal NTF2.

Figure 11:
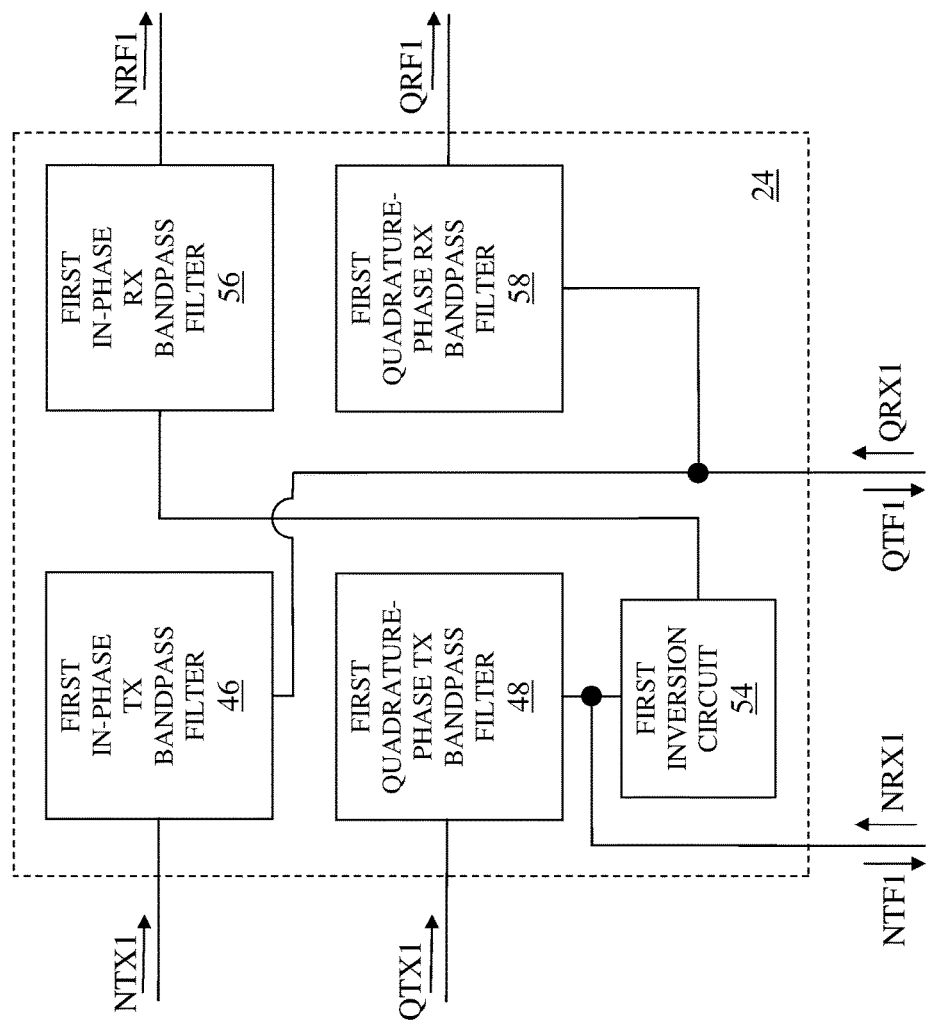
FIG. 11 shows details of the RF filter circuitry illustrated in FIG. 6 according to one embodiment of the RF filter circuitry.

FIG. 11 shows details of the RF filter circuitry 24 illustrated in FIG. 6 according to one embodiment of the RF filter circuitry 24. The RF filter circuitry 24 includes the first in-phase transmit bandpass filter 46, the first quadrature-phase transmit bandpass filter 48, a first in-phase receive bandpass filter 56, a second first quadrature-phase receive bandpass filter 58, and the first inversion circuit 54.

The first in-phase transmit bandpass filter 46 is coupled between the first quadrature-phase port QP1 (FIG. 6) and the second in-phase port NP2 (FIG. 6). The first in-phase receive bandpass filter 56 and the first inversion circuit 54 are coupled in series between the first in-phase port NP1 (FIG. 6) and the third in-phase port NP3 (FIG. 6). The first quadrature-phase transmit bandpass filter 48 is coupled between the first in-phase port NP1 (FIG. 6) and the second quadrature-phase port QP2 (FIG. 6). The first quadrature-phase receive bandpass filter 58 is coupled between the first quadrature-phase port QP1 (FIG. 6) and the third quadrature-phase port QP3 (FIG. 6).

The first in-phase transmit bandpass filter 46 receives and filters the first in-phase transmit signal NTX1 to provide the first filtered quadrature-phase transmit signal QTF1. The first quadrature-phase transmit bandpass filter 48 receives and filters the first quadrature-phase transmit signal QTX1 to provide the first filtered in-phase transmit signal NTF1. The first inversion circuit 54 and the first in-phase receive bandpass filter 56 receive, invert, and filter the first in-phase receive signal NRX1 to provide the first filtered in-phase receive signal NRF1. The first quadrature-phase receive bandpass filter 58 receives and filters the first quadrature-phase receive signal QRX1 to provide the first filtered quadrature-phase receive signal QRF1.

Figure 12:
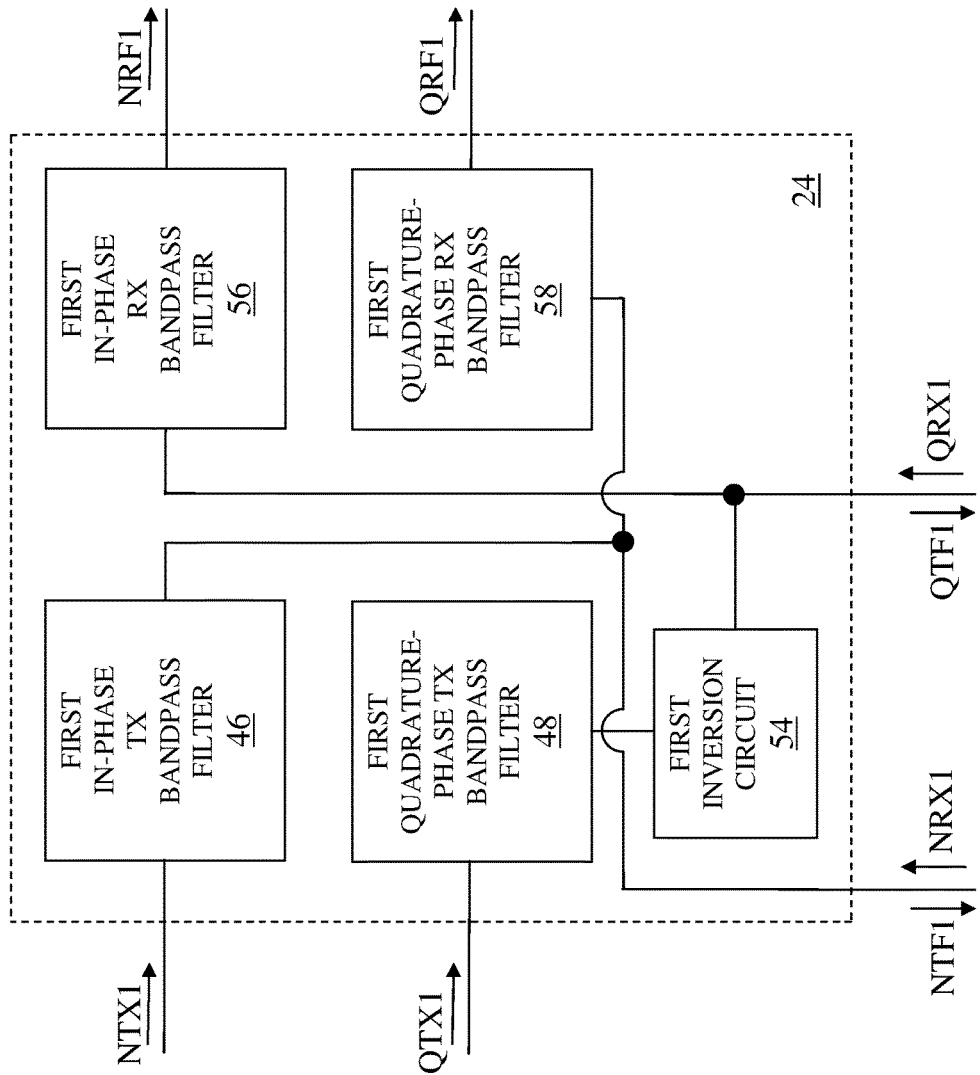
FIG. 12 shows details of the RF filter circuitry illustrated in FIG. 6 according to an alternate embodiment of the RF filter circuitry.

FIG. 12 shows details of the RF filter circuitry 24 illustrated in FIG. 6 according to an alternate embodiment of the RF filter circuitry 24. The RF filter circuitry 24 includes the first in-phase transmit bandpass filter 46, the first quadrature-phase transmit bandpass filter 48, the first in-phase receive bandpass filter 56, the first quadrature-phase receive bandpass filter 58, and the first inversion circuit 54.

The first in-phase transmit bandpass filter 46 is coupled between the first in-phase port NP1 (FIG. 6) and the second in-phase port NP2 (FIG. 6). The first in-phase receive bandpass filter 56 is coupled between the first quadrature-phase port QP1 (FIG. 6) and the third in-phase port NP3 (FIG. 6). The first quadrature-phase transmit bandpass filter 48 and the first inversion circuit 54 are coupled in series between the first quadrature-phase port QP1 (FIG. 6) and the second quadrature-phase port QP2 (FIG. 6). The first quadrature-phase receive bandpass filter 58 is coupled between the first in-phase port NP1 (FIG. 6) and the third quadrature-phase port QP3 (FIG. 6).

The first in-phase transmit bandpass filter 46 receives and filters the first in-phase transmit signal NTX1 to provide the first filtered in-phase transmit signal NTF1. The first in-phase receive bandpass filter 56 receives and filters the first quadrature-phase receive signal QRX1 to provide the first filtered in-phase receive signal NRF1. The first quadrature-phase transmit bandpass filter 48 and the first inversion circuit 54 receive, filter, and invert the first quadrature-phase transmit signal QTX1 to provide the first filtered quadrature-phase transmit signal QTF1. The first quadrature-phase receive bandpass filter 58 receives and filters the first in-phase receive signal NRX1 to provide the first filtered quadrature-phase receive signal QRF1.

Figure 13:
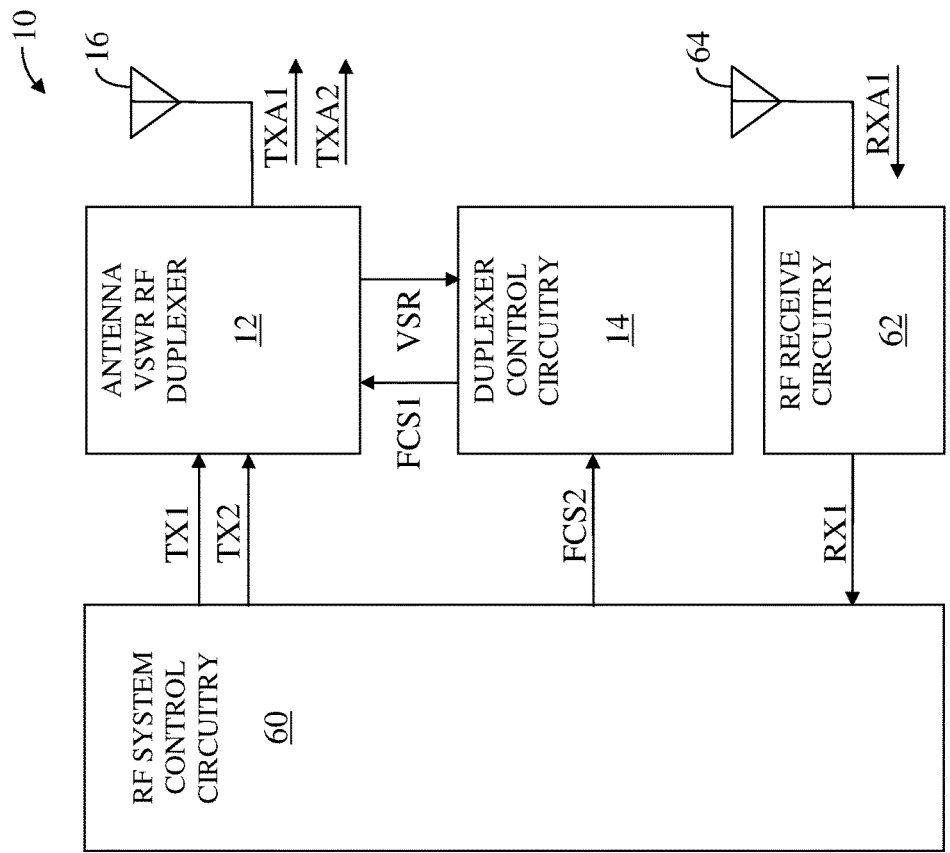
FIG. 13 shows RF circuitry according to one embodiment of the RF circuitry.

FIG. 13 shows RF circuitry 10 according to one embodiment of the RF circuitry 10. The RF circuitry 10 includes the antenna VSWR RF duplexer 12, the duplexer control circuitry 14, the RF antenna 16, RF system control circuitry 60, RF receive circuitry 62, and an RF receive antenna 64. The RF system control circuitry 60 provides the first transmit signal TX1 to the antenna VSWR RF duplexer 12, which processes the first transmit signal TX1 to provide the first antenna transmit signal TXA1 via the RF antenna 16. The RF system control circuitry 60 further provides the second transmit signal TX2 to the antenna VSWR RF duplexer 12, which processes the second transmit signal TX2 to provide the second antenna transmit signal TXA2 via the RF antenna 16.

The RF system control circuitry 60 provides a second function configuration signal FCS2 to the duplexer control circuitry 14. The duplexer control circuitry 14 provides the first function configuration signal FCS1 to the antenna VSWR RF duplexer 12. In one embodiment of the duplexer control circuitry 14, the duplexer control circuitry 14 configures the antenna VSWR RF duplexer 12 using the first function configuration signal FCS1. In one embodiment of the duplexer control circuitry 14, the first function configuration signal FCS1 is based on the second function configuration signal FCS2. The RF receive circuitry 62 receives and processes the first antenna receive signal RXA1 via the RF receive antenna 64 to provide the first receive signal RX1 to the RF system control circuitry 60.

In one embodiment of the antenna VSWR RF duplexer 12 and the duplexer control circuitry 14, the antenna VSWR RF duplexer 12 and the duplexer control circuitry 14 illustrated in FIG. 13 are similar to the antenna VSWR RF duplexer 12 and the duplexer control circuitry 14 illustrated in FIG. 1. In one embodiment of the antenna VSWR RF duplexer 12 and the duplexer control circuitry 14, the antenna VSWR RF duplexer 12 and the duplexer control circuitry 14 illustrated in FIG. 13 are similar to the antenna VSWR RF duplexer 12 and the duplexer control circuitry 14 illustrated in FIG. 2. In one embodiment of the antenna VSWR RF duplexer 12 and the duplexer control circuitry 14, the antenna VSWR RF duplexer 12 and the duplexer control circuitry 14 illustrated in FIG. 13 are similar to the antenna VSWR RF duplexer 12 and the duplexer control circuitry 14 illustrated in FIG. 3.

Figure 14:
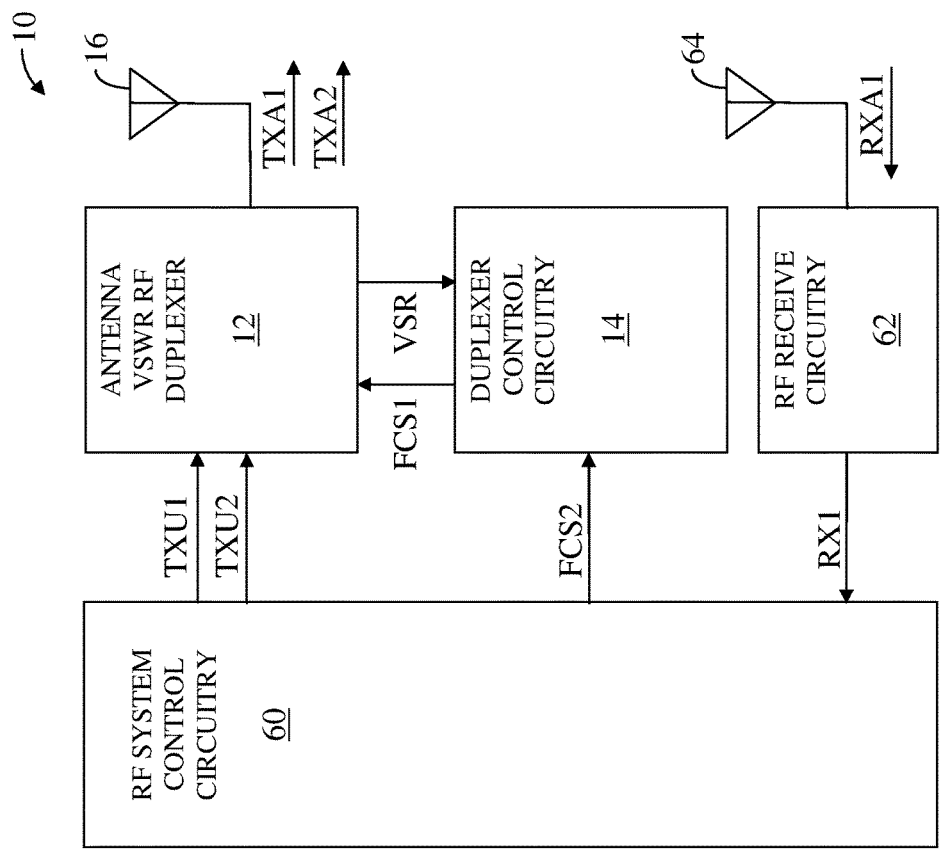
FIG. 14 shows the RF circuitry according to an alternate embodiment of the RF circuitry.

FIG. 14 shows the RF circuitry 10 according to an alternate embodiment of the RF circuitry 10. The RF circuitry 10 illustrated in FIG. 14 is similar to the RF circuitry 10 illustrated in FIG. 13, except in the RF circuitry 10 illustrated in FIG. 14, the RF system control circuitry 60 provides the first upstream transmit signal TXU1 to the antenna VSWR RF duplexer 12, which processes the first upstream transmit signal TXU1 to provide the first antenna transmit signal TXA1 via the RF antenna 16. The RF system control circuitry 60 further provides the second upstream transmit signal TXU2 to the antenna VSWR RF duplexer 12, which processes the second transmit signal TX2 to provide the second antenna transmit signal TXA2 via the RF antenna 16.

In one embodiment of the antenna VSWR RF duplexer 12 and the duplexer control circuitry 14, the antenna VSWR RF duplexer 12 and the duplexer control circuitry 14 illustrated in FIG. 14 are similar to the antenna VSWR RF duplexer 12 and the duplexer control circuitry 14 illustrated in FIG. 4. In one embodiment of the antenna VSWR RF duplexer 12 and the duplexer control circuitry 14, the antenna VSWR RF duplexer 12 and the duplexer control circuitry 14 illustrated in FIG. 14 are similar to the antenna VSWR RF duplexer 12 and the duplexer control circuitry 14 illustrated in FIG. 5.

Figure 15:
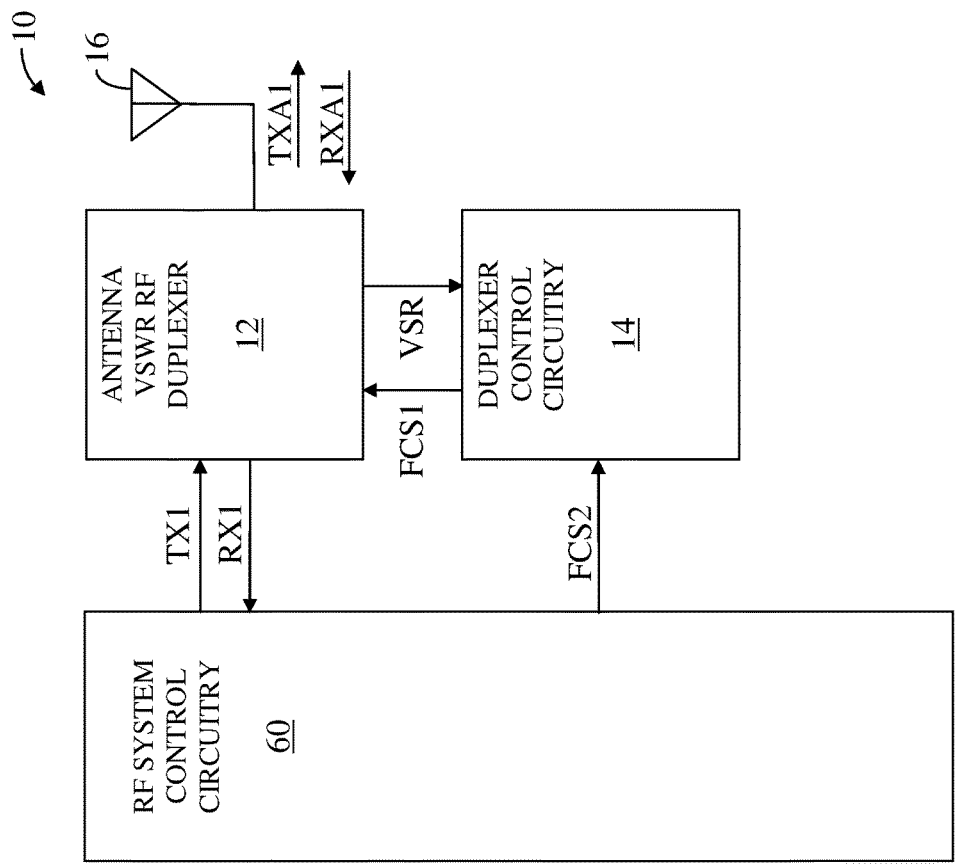
FIG. 15 shows the RF circuitry according to an additional embodiment of the RF circuitry.

FIG. 15 shows the RF circuitry 10 according to an additional embodiment of the RF circuitry 10. The RF circuitry 10 illustrated in FIG. 15 is similar to the RF circuitry 10 illustrated in FIG. 13, except in the RF circuitry 10 illustrated in FIG. 15, the RF receive circuitry 62, the RF receive antenna 64, the second transmit signal TX2 and the second antenna transmit signal TXA2 are omitted. Additionally, the antenna VSWR RF duplexer 12 receives and processes the first antenna receive signal RXA1 via the RF antenna 16 to provide the first receive signal RX1 to the RF system control circuitry 60.

In one embodiment of the antenna VSWR RF duplexer 12 and the duplexer control circuitry 14, the antenna VSWR RF duplexer 12 and the duplexer control circuitry 14 illustrated in FIG. 15 are similar to the antenna VSWR RF duplexer 12 and the duplexer control circuitry 14 illustrated in FIG. 6.

Figure 16:
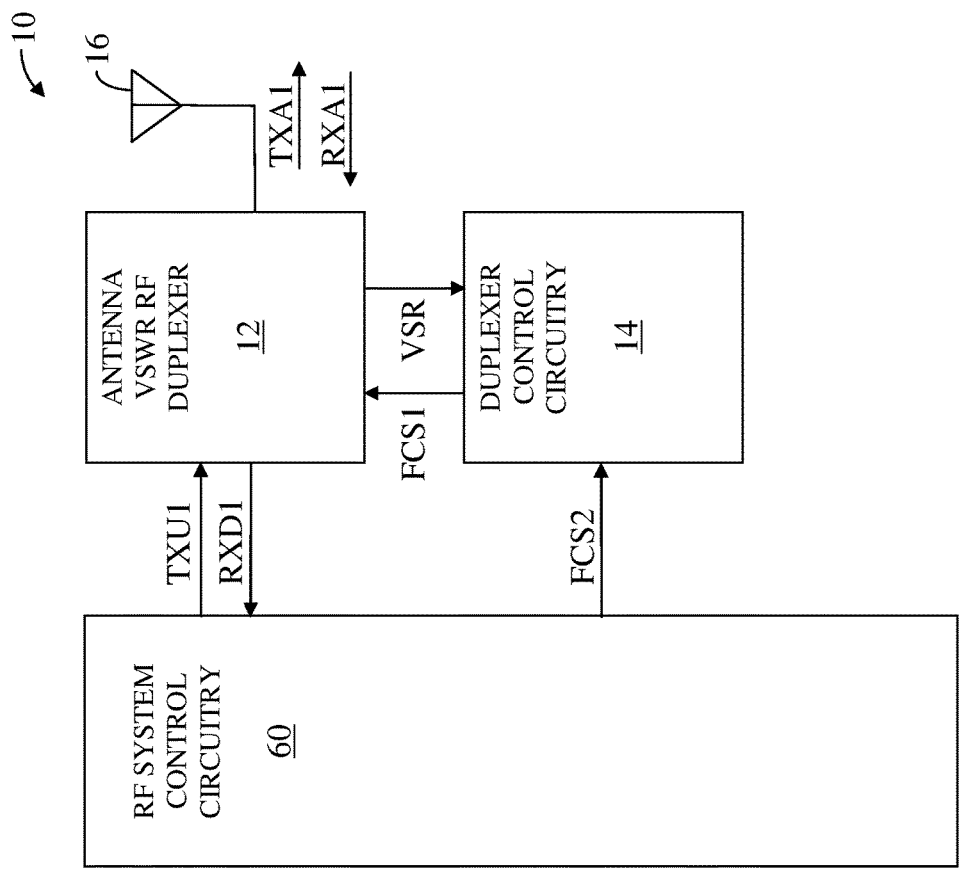
FIG. 16 shows the RF circuitry according to another embodiment of the RF circuitry.

FIG. 16 shows the RF circuitry 10 according to another embodiment of the RF circuitry 10. The RF circuitry 10 illustrated in FIG. 16 is similar to the RF circuitry 10 illustrated in FIG. 15, except in the RF circuitry 10 illustrated in FIG. 16, the first transmit signal TX1 is replaced with the first upstream transmit signal TXU1 and the first receive signal RX1 is replaced with the first downstream receive signal RXD1

In one embodiment of the antenna VSWR RF duplexer 12 and the duplexer control circuitry 14, the antenna VSWR RF duplexer 12 and the duplexer control circuitry 14 illustrated in FIG. 16 are similar to the antenna VSWR RF duplexer 12 and the duplexer control circuitry 14 illustrated in FIG. 7. In one embodiment of the antenna VSWR RF duplexer 12 and the duplexer control circuitry 14, the antenna VSWR RF duplexer 12 and the duplexer control circuitry 14 illustrated in FIG. 16 are similar to the antenna VSWR RF duplexer 12 and the duplexer control circuitry 14 illustrated in FIG. 8.

Those skilled in the art will recognize improvements and modifications to the preferred embodiments of the present disclosure. All such improvements and modifications are considered within the scope of the concepts disclosed herein and the claims that follow.

What is claimed is:

1. RF circuitry comprising:
   an antenna VSWR RF duplexer comprising:
   a first hybrid RF coupler having a first main port coupled to an RF antenna, a first isolation port, and a first pair of quadrature ports;
   a second hybrid RF coupler having a second main port, a second isolation port, and a second pair of quadrature ports;
   a third hybrid RF coupler having a third main port, a third isolation port, and a third pair of quadrature ports; and
   RF filter circuitry coupled to the first pair of quadrature ports, the second pair of quadrature ports, and the third pair of quadrature ports, wherein the antenna VSWR RF duplexer is configured to provide an antenna VSWR signal which is representative of VSWR mismatch conditions at the first main port; and
   duplexer control circuitry comprising a programmable bandpass filter configured to receive and filter the antenna VSWR signal to provide a filtered antenna VSWR signal and the duplexer control circuitry is configured to:
   determine a first impedance and a second impedance using the filtered antenna VSWR signal;
   present the first impedance to the second isolation port; and
   present the second impedance to the third isolation port.

2. The RF circuitry of claim 1 wherein the duplexer control circuitry is further configured to estimate a VSWR at the RF antenna using the antenna VSWR signal.

3. The RF circuitry of claim 1 wherein the duplexer control circuitry is further configured to adjust at least one of the first impedance and the second impedance based on the antenna VSWR signal to increase isolation between the second main port and the third main port.

4. The RF circuitry of claim 1 wherein the duplexer control circuitry is further configured to adjust at least one of the first impedance and the second impedance based on the antenna VSWR signal to decrease an impedance mismatch between the first main port and the RF antenna.

5. The RF circuitry of claim 1 wherein:
the third hybrid RF coupler is configured to provide a first receive signal via the third main port; and
a carrier frequency of the filtered antenna VSWR signal is essentially equal to a carrier frequency of the first receive signal.

6. The RF circuitry of claim 1 wherein:
the second hybrid RF coupler is configured to receive a first transmit signal via the second main port; and
a carrier frequency of the filtered antenna VSWR signal is essentially equal to a carrier frequency of the first transmit signal.

7. The RF circuitry of claim 1 wherein the duplexer control circuitry comprises:
a first programmable impedance circuit;
a 90-degree phase-shift circuit coupled between the first programmable impedance circuit and the second isolation port, wherein the 90-degree phase-shift circuit and the first programmable impedance circuit are configured to present the first impedance to the second isolation port; and
a second programmable impedance circuit coupled to the third isolation port and configured to present the second impedance to the third isolation port.

8. The RF circuitry of claim 1 wherein the antenna VSWR signal is a quadrature RF signal, such that the RF filter circuitry and the first hybrid RF coupler are further configured to provide the antenna VSWR signal using the first pair of quadrature ports.

9. The RF circuitry of claim 1 wherein the first isolation port is configured to be open.

10. The RF circuitry of claim 1 wherein the first hybrid RF coupler is further configured to provide the antenna VSWR signal via the first isolation port.

11. The RF circuitry of claim 1 wherein the antenna VSWR RF duplexer is configured to:
process a first transmit signal via the second hybrid RF coupler, the RF filter circuitry, and the first hybrid RF coupler to transmit a first antenna transmit signal via the first main port; and
receive and process a first antenna receive signal via the first hybrid RF coupler, the RF filter circuitry, and the third hybrid RF coupler to provide a first receive signal.

12. RF circuitry of claim 1 comprising:
an antenna VSWR RF duplexer comprising:
a first hybrid RF coupler having a first main port coupled to an RF antenna, a first isolation port, and a first pair of quadrature ports;
a second hybrid RF coupler having a second main port, a second isolation port, and a second pair of quadrature ports;
a third hybrid RF coupler having a third main port, a third isolation port, and a third pair of quadrature ports; and
RF filter circuitry coupled to the first pair of quadrature ports, the second pair of quadrature ports, and the third pair of quadrature ports, wherein the antenna VSWR RF duplexer is configured to provide an antenna VSWR signal;
wherein the antenna VSWR RF duplexer is configured to:
process a first transmit signal via the second hybrid RF coupler, the RF filter circuitry, and the first hybrid RF coupler to transmit a first antenna transmit signal via the first main port;
process a second transmit signal via the third hybrid RF coupler, the RF filter circuitry, and the first hybrid RF coupler to transmit a second antenna transmit signal via the first main port; and
simultaneously transmit the first antenna transmit signal and the second antenna transmit signal, such that the first antenna transmit signal and the second antenna transmit signal are transmit uplink carrier aggregation (TXULCA) signals; and
duplexer control circuitry configured to receive and process the antenna VSWR signal, which is representative of VSWR mismatch conditions at the first main port.

13. RF circuitry comprising:
an antenna VSWR RF duplexer comprising:
a first hybrid RF coupler having a first main port coupled to an RF antenna, a first isolation port, and a first pair of quadrature ports;
a second hybrid RF coupler having a second main port, a second isolation port, and a second pair of quadrature ports;
a third hybrid RF coupler having a third main port, a third isolation port, and a third pair of quadrature ports; and
RF filter circuitry coupled to the first pair of quadrature ports, the second pair of quadrature ports, and the third pair of quadrature ports, wherein the antenna VSWR RF duplexer is configured to provide an antenna VSWR signal;
a first transmit bandpass filter configured to receive and filter a first upstream transmit signal to provide a first transmit signal to the second hybrid RF coupler; and
duplexer control circuitry configured to receive and process the antenna VSWR signal, which is representative of VSWR mismatch conditions at the first main port;
wherein a frequency response of the first transmit bandpass filter is configured to be tunable based on a first function configuration signal.

14. The RF circuitry of claim 13 wherein:
the antenna VSWR RF duplexer further comprises a second transmit bandpass filter configured to receive and filter a second upstream transmit signal to provide a second transmit signal to the third hybrid RF coupler; and
a frequency response of the second transmit bandpass filter is configured to be tunable based on the first function configuration signal.

15. The RF circuitry of claim 13 wherein:
the antenna VSWR RF duplexer further comprises a first receive bandpass filter configured to receive and filter a first receive signal from the third hybrid RF coupler to provide a first downstream receive signal; and
a frequency response of the first receive bandpass filter is configured to be tunable based on the first function configuration signal.

16. RF circuitry comprising:
an antenna VSWR RF duplexer comprising:
a first hybrid RF coupler having a first main port coupled to an RF antenna, a first isolation port, a first in-phase port, and a first quadrature-phase port;
a second hybrid RF coupler having a second main port, a second isolation port, a second in-phase port, and a second quadrature-phase port;

a third hybrid RF coupler having a third main port, a third isolation port, a third in-phase port, and a third quadrature-phase port; and RF filter circuitry coupled to the first pair of quadrature ports, the second pair of quadrature ports, and the third pair of quadrature ports, the RF filter circuitry comprising a first in-phase transmit bandpass filter coupled between the first in-phase port and the second in-phase port;

wherein the antenna VSWR RF duplexer is configured to provide an antenna VSWR signal; and duplexer control circuitry configured to receive and process the antenna VSWR signal, which is representative of VSWR mismatch conditions at the first main port.

17. The RF circuitry of claim 16 wherein:

the RF filter circuitry further comprises a second in-phase transmit bandpass filter and a first inversion circuit coupled in series between the first in-phase port and the third in-phase port;

the RF filter circuitry further comprises a first quadrature-phase transmit bandpass filter coupled between the first in-phase port and the second quadrature-phase port; and the RF filter circuitry further comprises a second quadrature-phase transmit bandpass filter coupled between the first quadrature-phase port and the third quadrature-phase port.

18. The RF circuitry of claim 16 wherein:

the RF filter circuitry further comprises a second in-phase transmit bandpass filter between the first quadrature-phase port and the third in-phase port;

the RF filter circuitry further comprises a first quadrature-phase transmit bandpass filter and a first inversion circuit coupled in series between the first quadrature-phase port and the second quadrature-phase port; and the RF filter circuitry further comprises a second quadrature-phase transmit bandpass filter coupled between the first in-phase port and the third quadrature-phase port.

* * * * *

UNITED STATES PATENT AND TRADEMARK OFFICE
CERTIFICATE OF CORRECTION

PATENT NO. : 10,148,310 B2
APPLICATION NO. : 15/204291
DATED : December 4, 2018
INVENTOR(S) : Nadim Khlat Page 1 of 1

It is certified that error appears in the above-identified patent and that said Letters Patent is hereby corrected as shown below:

In the Claims

In Column 19, Line 52, replace "RF circuitry of claim 1 comprising" with --RF circuitry comprising--.

Signed and Sealed this
Twenty-ninth Day of January, 2019

Andrei Iancu
*Director of the United States Patent and Trademark Office*